US007782482B2

(12) United States Patent
Tanaka

(10) Patent No.: US 7,782,482 B2
(45) Date of Patent: Aug. 24, 2010

(54) COLOR COMPENSATION OF PRINTING DEVICE

(75) Inventor: Kentaro Tanaka, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1401 days.

(21) Appl. No.: 11/058,303

(22) Filed: Feb. 14, 2005

(65) Prior Publication Data
US 2005/0190389 A1 Sep. 1, 2005

(30) Foreign Application Priority Data

Feb. 13, 2004 (JP) .............................. 2004-035946
Feb. 13, 2004 (JP) .............................. 2004-035948

(51) Int. Cl.
*G06F 15/00* (2006.01)
*G06K 1/00* (2006.01)
*H04N 1/60* (2006.01)
*G06F 3/08* (2006.01)

(52) U.S. Cl. ........................................ 358/1.9; 358/518

(58) Field of Classification Search ................. 358/518, 358/1.9, 3.1, 504, 512, 515–522; 347/5, 347/6, 7, 9, 10, 11, 14, 19, 74
See application file for complete search history.

(56) References Cited

U.S. PATENT DOCUMENTS 6,621,594 B1 * 9/2003 Kuwata et al. ............... 358/3.1

2003/0202192 A1 * 10/2003 Kuwata et al. ............... 358/1.9
2003/0214686 A1 * 11/2003 Saito et al. ................... 358/504

FOREIGN PATENT DOCUMENTS

JP 02-195776 8/1990
JP 10-278360 10/1998

OTHER PUBLICATIONS

Abstract of Japanese Patent Publication No. 02-195776, Pub. Date: Aug. 2, 1990, Patent Abstracts of Japan.
Abstract of Japanese Patent Publication No. 10-278360, Pub. Date: Oct. 20, 1998, Patent Abstracts of Japan.

\* cited by examiner

*Primary Examiner*—Douglas Q Tran
(74) *Attorney, Agent, or Firm*—Martine Penilla & Gencarella, LLP

(57) ABSTRACT

A color correcting method for compensating a color drift in a printing device includes determining an ink recording rate having a maximum variation of colorimetric data from among a plurality of stages of ink recording rates. The variation of colorimetric data occurs by means of a variation of an amount of ink adhering on the printing medium on each printing device. The color correcting method includes controlling the printing device to print a standard image of the determined ink recording rate on the printing medium. The color correcting method also includes compensating a color drift in the printing device having printed the standard image by correcting the printing data based on a result of comparing the standard image of the ink recording rate having the maximum variation printed on the printing medium with a reference standard image.

20 Claims, 19 Drawing Sheets

FIG. 12

Dot distribution table 14d (the case of C)

| Input gradation values | Output gradation values | | | | | | | | |
|---|---|---|---|---|---|---|---|---|---|
| | S1 | M1 | L1 | S2 | M2 | L2 | S3 | M3 | L3 |
| 0 ⋮ Ai ⋮ 255 | 0 ⋮ 0 | 0 ⋮ 0 | 0 ⋮ 255 | 0 ⋮ 0 | 0 ⋮ 0 | 0 ⋮ 255 | 0 ⋮ 0 | 0 ⋮ 0 | 0 ⋮ 255 |

⎵ D11 ⎵ D12 ⎵ D13

⇩

After correction

| Input gradation values | Output gradation values | | | | | | | | |
|---|---|---|---|---|---|---|---|---|---|
| | S1 | M1 | L1 | S2 | M2 | L2 | S3 | M3 | L3 |
| 0 ⋮ ACi ⋮ 255 | 0 ⋮ 0 | 0 ⋮ 0 | 0 | 0 ⋮ 0 | 0 ⋮ 0 | 0 | 0 ⋮ 0 | 0 ⋮ 0 | 0 |

FIG. 17

Standard recording rate table D21

(Case of Y set mode 1)

Small ← Ink amount of dot → Large

| Type of dot | Small dot 1 | Medium dot 1 | Large dot 1 |
|---|---|---|---|
| Standard dot recording rate | 90% | 50% | 30% |

Large ← Dot recording rate → Small

COLOR COMPENSATION OF PRINTING DEVICE

BACKGROUND OF THE INVENTION

1. Field of the Invention

The present invention relates to a color correcting method, a color correcting device, a printing control device, a medium for recording the color correcting program for compensating a color drift in the printing device for printing on printing medium image corresponding to printing data by using a printing head, a printing control device, a printing control method for controlling printing on the printing device.

2. Description of the Related Art

Ink jet printers that had been mass produced in the past included an array of printing nozzles for each color (type) of ink and a nonvolatile semiconductor memory to record ID (error information) for compensating drifts in the weight of ink discharged from each array of printing nozzles. Before proceeding to a printing control for each printer, color correcting data such as LUT (look-up table) for calibration adapted to the ID are prepared and stored in advance, and any error in the weight of ink is compensated so that the weight of ink discharged from the printing head may conform to the standard printer (the standard equipment) by referring color correcting data corresponding to the ID (see, for example, Japanese Unexamined Patent Publication Hei 10 (1998)-278360).

At production factories of printers, the weight of a specified number of drops of ink discharged from a printer head not yet incorporated into the printer is measured, and the difference with the weight of ink from the standard printer is correlated with ID and is recorded in a nonvolatile semiconductor memory to proceed to a calibration operation.

The work of measuring the weight of ink discharged from a printing head is time consuming to some extent. However, speedy implementation of calibration operation was desired in order to reduce costs in the mass production of printers. In addition, due to delicate variations in the voltage applied to each printing head when it is incorporated into a printer, there developed delicate errors in the color of image printed on the printing medium.

SUMMARY OF THE INVENTION

The present invention was made in view of the issues described above, and its object is to acquire a good color reproductivity in relation to the reference color for the printing device while speeding up the calibration operation of the printer and other printing devices.

In order to achieve the above object, one aspect of the present invention resides in a color correcting method for compensating a color drift in a printing device for printing on a printing medium a printing image corresponding to printing data by using a printing head for adhering ink on the printing medium, the method comprising: controlling the printing device to print on the printing medium a standard image of an ink recording rate having a maximum variation in colorimetric data due to variations in an amount of ink adhering on the printing medium, the variations for the ink occurring on each printing device; and compensating a color drift in the printing device having printed the standard image by correcting the printing data based on a result of comparing the standard image of the ink recording rate having the maximum variation printed on the printing medium with a reference standard image.

In other words, the printing device mentioned above is controlled to print on the printing medium the standard image of which the amount of ink recording data shows the maximum variation as a result of color measurement due to uneven amount of ink adhering on the printing medium that occurs for each printing device for the ink. And the standard image having the maximum variation in the amount of its ink recording data printed on the printing medium and the standard image serving as the reference are compared to correct the printing data based on the result of the comparison, and thus a color drift in the printing device having printed the standard image are compensated.

As printing data are corrected based on the result of comparison between the standard image having the maximum variation in the colorimetric data due to variation of ink adhering on the printing medium that occurs for each printing device for the ink and the standard image serving as the reference, printing data are corrected with a high precision. And as it is enough to correct printing data based on the result of comparison between the standard image of which the amount of ink recording data shows the maximum variation as a result of color measurement due to uneven amount of ink adhering on the printing medium that occurs for each printing device for the ink and the standard image serving as the reference, it is possible to speed up the calibration work of printing devices. In addition, as printing data are corrected based on the standard image printed on the printing medium while the printing head is incorporated in the printing device, no delicate errors in the color of printed image develop due to delicate unevenness of voltage applied on the printing head, and it is possible to improve color reproductiveness in relation to the reference color for the printing device subjected to calibration (hereinafter referred to also as "objective printing device").

The standard image may be compared visually. However, their colorimetric data may be acquired and they may be compared based on such colorimetric data. In other words, the colorimetric data of the standard image are acquired by measuring the color of the standard image with the maximum variation in the amount of ink recording data printed on the printing medium in specified color space. And the printing data are corrected on the basis of the comparison of the colorimetric data thus acquired and the standard colorimetric data, and a color drift in the printing device that printed the standard image are compensated.

When a color drift of printing devices are compensated, printing data are corrected based on the result of comparison between the colorimetric data of the standard image with the maximum variation in colorimetric due to variation in the amount of ink adhering on the printing medium occurring for each printing device for the ink and the reference colorimetric data, printing data are corrected with a high precision. And as it is enough to correct printing data based on the result of comparison between the colorimetric data of the standard image with the maximum variation in ink recording rate on the printing medium that occurs for each printing device for the ink and the reference colorimetric data, it is possible to speed up the calibration operation of printing devices. In addition, as printing data are corrected based on the standard image printed on the printing medium while the printing head is incorporated in the printing device, no delicate errors in the color of printed image develop due to a delicate variation of voltage applied on the printing head, and it is possible to improve color reproductiveness in relation to the reference color for the object printing device.

The amount of ink recording data may be an amount of dots for recording expressed by the number of ink dots formed by a unit area on the printing medium, may be a dot recording ratio expressed by the ratio of number of ink dots, may be an ink recording density expressed by the number of the ink dots formed for a unit area on the printing medium converted into a specified type of dot such as large dot when a printing device on which a plurality of types of dots can be used, or may be an ink recording ratio expressed by the ratio of number of the ink dots.

The standard image may be an image formed by a single type of ink, or an image formed by two or more types of ink. Here, the adoption of a wholly uniform plain image for the standard image will enable to acquire more correct colorimetric data, and to acquire a good color reproductiveness in relation to the reference color for the object printing device.

The specified color space may be defined as a color space consists of a plurality of color components. The color components may be combined in a variety of ways such as the color components L*, a* and b* in the case of the color space L*a*b* CIE specified by the International Commission of Illumination (CIE), the color components L*, u* and v* in the case of the color space L*u*v* CIE, the color components X, Y and Z in the case of the color space XYZ CIE, the color components R, G and B in the case of the RGB color space, and the like. The index amounts may be combined in a variety of ways such as L* amount, a* amount and b* amount corresponding to the color components L*, a* and b*, L* amount, u* amount and v* amount corresponding to the color components L*, u* and v*, X amount, Y amount and Z amount corresponding to the color components X, Y and Z, R amount, G amount and B amount corresponding to the color components R, G and B. Here, L* is an element color representing luminosity, and a*, b*, u*, and v* are element colors representing hue and saturation. Hereinafter, (*) will be omitted when they will be indicated.

Various data can be used for the printing data mentioned above. For example, they may take the form of data expressing image by gradation data for each picture element. The gradation data may be 256 gradations before a half-tone processing, or two gradations after a half-tone processing. The picture element may be of any number as far as an image can be expressed thereby, and a plurality of picture elements may constitute a block. For example, 4×4 picture elements, 8×8 picture elements or any other combinations suitable for expressing a small image may be adopted.

A color drift in the printing device may be defined as one from the reference color. For example, when it is defined as a color drift from the reference printing device (reference equipment) serving as the reference, it will be possible to compensate a color drift more properly. Of course, the reference colorimetric data maybe colorimetric data of the reference color, and also those of colors other than the reference color.

When the printing device is used to print a standard image, if dot amount data are created for printing the standard image from the ink recording rate, and if the dot amount data are used to control the printing device to print the standard image on the printing medium, it will be possible to use a part of the process of having images for printing printed by using the printing data, the implementation of the present color correction method is simplified, and the program or devices designed to carry out the present method can be simplified.

When the printing device is used to print a standard image, it is possible to simplify the program or devices for carrying out the present color correction method and to reduce the consumption of printing media for printing the standard image at the time of calibration operation by having only standard image with the maximum variation in amount of ink recording printed.

When a color drift in the printing device used in printing the standard image are to be compensated, color correcting data specifying the correspondence relationship between the time before and after the correction of the printing data for compensating the color drift may be created and stored at a specified storage area, and the color correcting data may be used to correct printing data. Or, a plurality of different pieces of identification information (for example ID) and a plurality of different color correcting data may be correlated, color correcting data for compensating a color drift may be chosen from among the plurality of color correcting data, identification information corresponding to the chosen color correcting data may be stored at a specified storage area, and the color correction data corresponding to the identification data may be used to correct the printing data. Thus, such a simple mechanism of using color correcting data can compensate a color drift in printing devices. Here, the color correcting data may be a color correction table in the form of an information table, or may be data for calculation. The color correcting data may be many data such as LUT for calibration, converting formula for calibration, color conversion LUT (color conversion table) and the like.

Or, the amount of ink recording for printing the standard image may be further determined. On such an occasion, a plurality of images for the determination of amount of recording with varied amount of ink recording for a first printing device and a second printing device for which the amount of ink adhering on the printing medium is different are printed on the printing medium, and the colors of each image for the determination of recording rate printed by the first and second printing devices are measured in the specified color space to acquire the first and second colorimetric data for each image for the determination of the recording rate. Then, the amount of ink recording with the maximum variation of colorimetric data due to the variation of ink amount adhering to the printing media that occurs on each printing device is determined as the amount of ink recording for printing the standard image from the first and second colorimetric data and the recording rate of ink with which the same plurality of images for determining recording rate are printed. And the standard image of an amount of ink recording determined for the printing devices are printed on the printing medium. Then, as the amount of ink recording for printing the standard image is determined from the colorimetric data of the images for determining recording rate printed on the printing medium, it will be possible to acquire a good color reproductiveness in relation to the reference color for the objective printing device.

Or, the first printing device may be constituted by providing the reference printing device with a first printing head, and the second printing device may be constituted by providing the reference printing device with a second printing head wherein the amount of ink adhering on the printing medium is more than the first printing head.

When the first and second printing devices are provided with a mechanism wherein ink adheres on the printing medium at the lowest limit and the upper limit of variation in the ink amount, it is possible to further improve their color reproductiveness in relation to the reference color for the objective printing device.

For compensating a color drift in the printing device having printed the standard image, it is also possible to compensate a color drift in the printing device having printed the standard image by using the result of comparing only the index amounts having the maximum variation in relation to the variation of amount of ink recording from among a plurality of index amounts acquired from the colorimetric data for correcting the printing data when the printing data are corrected based on the result of comparing the colorimetric data of the standard image having the maximum variation in the amount of ink recording acquired as described above and the reference colorimetric data. In other words, the printing data are corrected only by comparing the index amounts having the maximum variation with the variation in the amount of ink recording from among a plurality of index amounts acquired from colorimetric data and a color drift in the printing device having printed the standard image are corrected.

As the result of comparing the maximum index amount in relation to the variation of amount of ink recording from among a plurality of index amounts acquired in the color space serving as the reference for color measurement when a color drift in the printing device are compensated is used to correct the printing data, the printing data are corrected with a high precision. And as it is enough to correct the printing data by using the result of comparing only index amounts with the maximum variation, it will be possible to speed up the calibration work of printing devices.

For the index amounts mentioned above, any of the color components in the specified color space, quantity acquired from two or more combinations of a plurality of color components and other quantities may be adopted.

And the index amounts for correcting the printing data may be further specified. On such an occasion, the reference printing device is made to print a plurality of images for the selection of index amount with varied ink recording rates, and the colors of each image for the selection of printed index amount are measured in the specified color space to acquire the colorimetric data for each image for the selection of index amount. Then, the selective index amount with the maximum variation in relation to the variation of ink recording rate from among a plurality of index amounts acquired from the colorimetric data based on the colorimetric data and the amount of ink recording for printing the plurality of images for the selection of index amount is specified as the index amount for correcting the printing data. And the printing data are corrected by using the result of comparing only the index amount for selection. Then, as the index amount for correcting the printing data based on the colorimetric data of the images for selecting the index amount printed on the printing medium, it will be possible to acquire a good color reproductiveness in relation to the reference color for the objective printing device.

The image for determining the recording data amount or the image for selecting index amount may be images similar to the standard image. Here, the adoption of wholly uniform plain image for the image for determining amount of recording or the image for selecting index amount will open the way to acquire more precise colorimetric data, and to acquire a good color reproductiveness in relation to the reference color for the objective printing device.

For specifying the index amount for correcting the printing data, it is possible to use the reference printing device to print the image for selecting the index amount on the printing medium at mutually different amounts of recording for the ink, specifically at a first amount of recording and a second amount of recording, to measure the color of each image for selecting index amount printed in specified color space to acquire the colorimetric data relating to the images for selecting both index amounts, to calculate the difference of index amounts relating to the image for selecting both index amounts for every plurality of index amounts, and to specify the index amount of which the difference is the maximum as the selective index mount. Then, it will be possible to speed up the calibration work of printing devices with a simple system.

The difference of index amount relating to the image for selecting the index amount may be greater in value as the difference between both index amounts grows larger.

Here, when the combination of the first recording rate and the second recording rate are set to be the minimum and the maximum of the varied recording rate of ink as described above, it will be possible to acquire a good color reproductiveness in relation to the reference color for the objective printing device by means of a simple arrangement.

If the plurality of index amounts are assumed to be entirely at gradation values of the same gradation number, it is useful in that it ensures more positively that a good color reproductiveness will be acquired in relation to the reference color for the objective printing device, and it is also useful in that it facilitates the construction of the system if, for example, each amount defining each color space is taken as it is as the plurality of index amounts.

For specifying the index amount for correcting the printing data, the index amount with the maximum variation in relation to the variation of recording rate of the ink from among the plurality of index amount in the recording rate of ink determined as described above may be specified as the index amount for confirming the selective index amount, and when the specified index amount is different from the selective index amount, the selective index amount may be replaced by the specified index amount, and for determining the ink recording rate for printing the standard image, when the selective index amount is replaced by the specified index amount, the color of each image for determining recording rate serving as the changed selective index amount and printed by the first and second printing devices may be measured in the specified color space to acquire a first selective index amount and a second selective index amount for each image for determining the recording rate, and the recording rate with the maximum variation due to the variation of ink amount adhering on the printing medium occurring for each printing device with regard to the selective index amount may be determined.

When the recording rate of ink for printing the standard image is determined after the selection of the selective index amount with the maximum variation in relation to the variation in the recording rate of ink, the determined recording rate of ink does not guarantee that the variation of the index amount would be maximum in relation with the variation of the recording rate of ink. Therefore, the system described above will enable to improve further the color reproductiveness of the objective printing devices in relation to the reference color.

For having the standard image printed by the printing devices, the printing device may be the controlled to print standard image of the ink recording rate with the maximum variation in colorimetric data due to the variation in the amount of ink adhering on the printing medium that occurs for each printing device for each type of ink on the printing medium, and the printing data may be corrected for each type of ink when a color drift in the printing device having printed the standard image are compensated. Then, it will be possible to improve further color reproductiveness in relation to the reference color for the objective printing device.

For printing the standard image by the printing devices, the standard image of the dot recording rate with the maximum variation in colorimetric data due to the variation in the amount of ink adhering on the printing medium that occurs for each printing devices for each type of dot for the ink may be printed on the printing medium by the printing device, and the printing data may be corrected for each type of dot when a color drift in the printing device having printed the standard image are compensated. Then, it will be possible to improve further color reproductiveness in relation to the reference color for the objective printing device.

An another aspect of the present invention includes controlling the printing device to print a standard image of a standard recording rate for the ink on the printing medium; measuring colors of a standard image printed on the printing medium in a specified color space consisting of a plurality of color components as their index amounts to acquire colorimetric data of the standard image; correcting the printing data using a result of comparison of only the index amounts with maximum variations in relation to the variation in the recording rate of the ink from among a plurality of index amounts corresponding to color components, when the colorimetric data and the reference colorimetric data are compared and the result of comparison are used to correct the printing data; and compensating the color drift in the printing device having printed the standard image by the correction.

In other words, the printing device is controlled to print the standard image of the standard recording rate for the ink on the printing medium. And the colors of the standard image printed on the printing medium are measured in specified color space consisting of a plurality of color components to acquire colorimetric data of the standard image. And the result of comparing the colorimetric data thus acquired and the reference colorimetric data are used to correct the printing data, and the result of comparing only index amounts with the maximum variation relation to the variation of the ink recording rate from among a plurality of index amounts are used to correct the printing data, and a color drift in the printing device used to print the standard image are compensated.

As the printing data are compensated by using the result of comparing index amounts with the maximum variation in relation to the variation of ink recording rate from among a plurality of index amounts in the color space that serve as the basis for measuring colors when the color drift in the printing device are compensated (referred to also as "color compensation"), the printing data are corrected with a high precision. And as it is enough to correct the printing data by using the result of comparing only index amounts with the maximum variation, it will be no longer necessary to proceed to complicated calculations during the calibration operation of the printing devices. Therefore, it is possible to speed up the calibration operation. In addition, since the printing data are corrected by using index amounts acquired by measuring colors of the standard image printed on the printing medium while a printing head is incorporated into the printing device, delicate color errors of the images for printing do not appear due to a delicate variation of voltage applied to the printing head and the like, and it is possible to improve the color reproductiveness of the printing device object of calibration in relation with the reference color.

The limitation of the standard recording rate to a type is preferable in that it enables to speed up the calibration operation. However, it is also possible to provide several stages of standard recording rate.

For acquiring the colorimetric data of the standard image, if only index amounts with the maximum variation in relation with the variation of the ink recording rate from among the plurality of index amounts are acquired, it is possible to simplify the program or equipment designed to carry out the present color correction method.

For having the printing device print the standard image by the ink, the dot printing amount of the standard image printed by the second dot requiring more ink than the first dot may be reduced to less than the dot recording rate of the standard image printed by the first dot and the printing device may be controlled to print standard image of the standard recording rate separately by the first and second dots on the printing medium.

For having the printing device print the standard image, the printing device may be made to print standard image of the standard recording rate on the printing medium separately by the type of dot by reducing the dot recording rate of the standard image printed as the amount of ink for the dot by the ink mentioned above increases.

As the recording rate of which the variation of selected index amount is important due to the variation of the amount of ink adhering to the printing medium occurring for each printing device decreases as the ink amount of a dot increases, the method described above will enable to improve further the color reproductiveness for the objective printing device in relation to the reference color.

Or, the construction of a color correcting device corresponding to the control method described above will lead to the acquisition of essentially similar action and effect.

In another aspect, it is also possible to provide a printing control device for controlling a printing device to print on a printing medium a printing image corresponding to printing data by using a printing head for adhering ink on the printing medium, wherein when (i) the printing device is controlled to print on the printing medium a standard image of an ink recording rate with a maximum variation in colorimetric data due to variations in an amount of ink adhering on the printing medium, the variation occurring on each printing device for the ink, (ii) a standard image of an ink recording rate having the maximum variation printed on the printing medium is compared with a reference standard image, (iii) the printing data is corrected from the comparison result, and (iv) a relationship of correspondence for correction of colors before and after a correction of the printing data is specified, the relationship used for compensating a color drift in the printing device, the printing control device comprises: a unit for correcting the printing data in view of the specified relationship of correspondence for the correction of colors; and a unit for controlling the printing device to print on the printing medium images for printing corresponding to the corrected printing data. Here, the standard image may be compared visually or based on colorimetric data.

When the color drift in the printing device are compensated, printing data are corrected by the result of comparing the standard image of the ink recording rate with the maximum variation in colorimetric data due to a variation in the amount of ink adhering on the printing medium and the reference standard image. Therefore, the printing data are corrected with a high precision. And as it is enough to specify the relationship of correspondence of color correction before and after the correction of printing data by the result of comparing the standard image of only the ink recording rate with the maximum variation in colorimetric data and the reference standard image, it is possible to speed up the calibration work of the printing device that is object of printing control. And as the printing data are corrected by the relationship of correspondence of correcting colors by using the standard image printed on the printing medium, it will be possible to improve the color reproductiveness of the printed image in relation to the reference colors.

In another aspect, it is possible to provide a printing control device for controlling a printing device to print on a printing medium printing images corresponding to printing data by using a printing head for adhering ink on the printing medium wherein when (i) the printing device is controlled to print on the printing medium a standard image of a standard recording rate by the ink, (ii) the color of the standard image printed on the printing medium, in the specified color space consisting of a plurality of color components, is measured to acquire the colorimetric data of the standard image, (iii) the colorimetric data of the standard image is compared with a reference standard image to correct the printing data, the correction being made by using a result of comparison of only index amounts with the maximum variation in relation to the variation in the recording rate of the ink from among the plurality of index amounts corresponding to color components, and (iv) a relationship of correspondence for correction of colors before and after a correction of the printing data is specified, the relationship used for compensating a color drift in the printing device, the printing control device comprises: a unit for correcting the printing data in view of the specified relationship of correspondence for the correction of colors, and a unit for controlling the printing device to print on the printing medium images for printing corresponding to the corrected printing data.

As the printing data are corrected by the relations of correspondence for the correction of colors before and after the correction of the printing data by using the result of comparing the index amounts with the maximum variation in relation to the variation of ink recording rate from among a plurality of index amounts in color space serving as the basis of color measurement at the time of color compensation, the printing data are corrected with a high precision. And as it is enough to specify the relations of correspondence for the correction of colors of the printing data by using the result of comparing only the index amounts of the maximum variation, it will be no longer necessary to proceed to convoluted calculations at the time of the calibration operation of the printing device that is the object of the printing control. Therefore, it will be possible to speed up the calibration work of the printing device that is the object of the printing control. And as the relationship of correspondence for the correction of colors based on the index amounts acquired by measuring the colors of the standard image printed on the printing medium serve as the basis for the correction of the printing data, it will be possible to improve the color reproductiveness of the images for printing in relation to the reference color.

The color correcting device or the printing control device described above can be implemented together with other methods incorporated in certain equipments and include a variety of modes in this respect. For example, they can be applied as a printing system incorporating a printing device. And it is also possible to process by following a specified procedure corresponding to the structure of the printing control device described above, and therefore the present invention, as a control method, can produce actions and effects similar to those described above. In addition, since various devices described above sometimes executes control programs, programs or program products designed to make computers function as various devices mentioned above, or recording media readable by computers wherein such programs are recorded can produce actions and effects similar to those described above.

BRIEF DESCRIPTION OF THE DRAWINGS

FIG. 12 is an illustration showing schematically the structure of the table of distributing dots.

FIG. 17 is an illustration showing schematically the structure of the standard recording ratio table in a variant.

DETAILED DESCRIPTION

Figure 1:
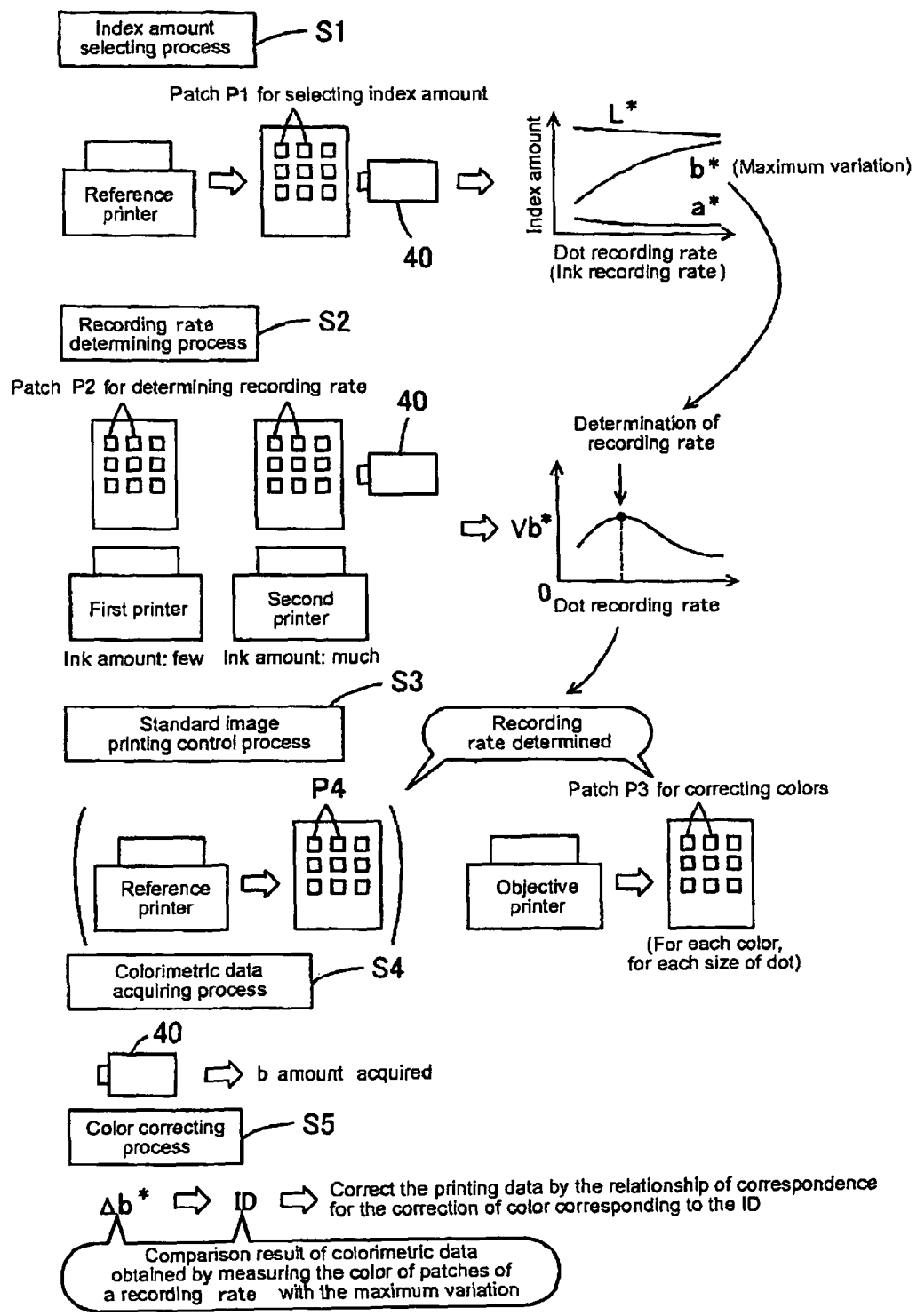
FIG. 1 is an illustration showing schematically a color correcting method.
Figure 2:
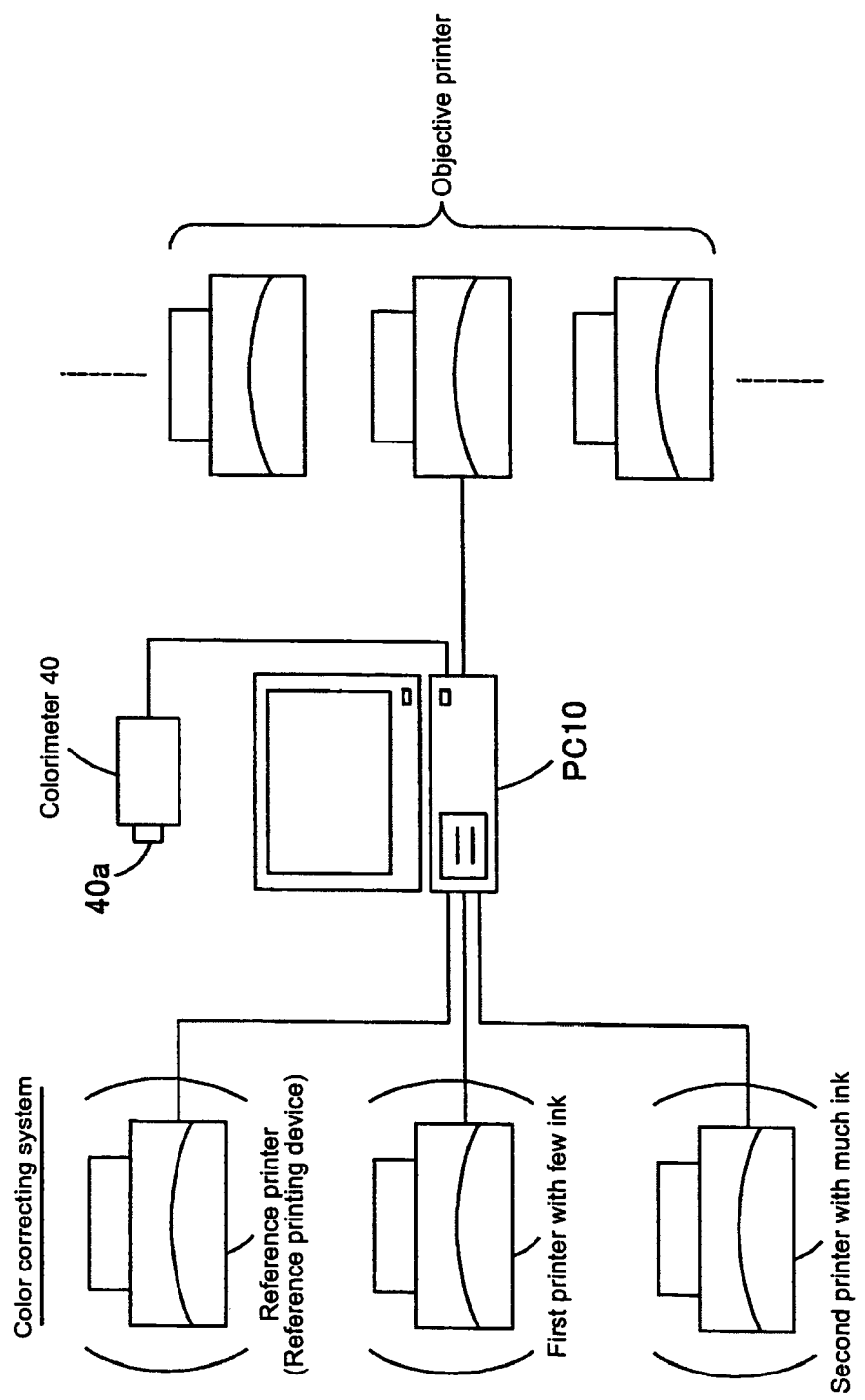
FIG. 2 is a block diagram showing the outline of the color correcting system.
Figure 3:
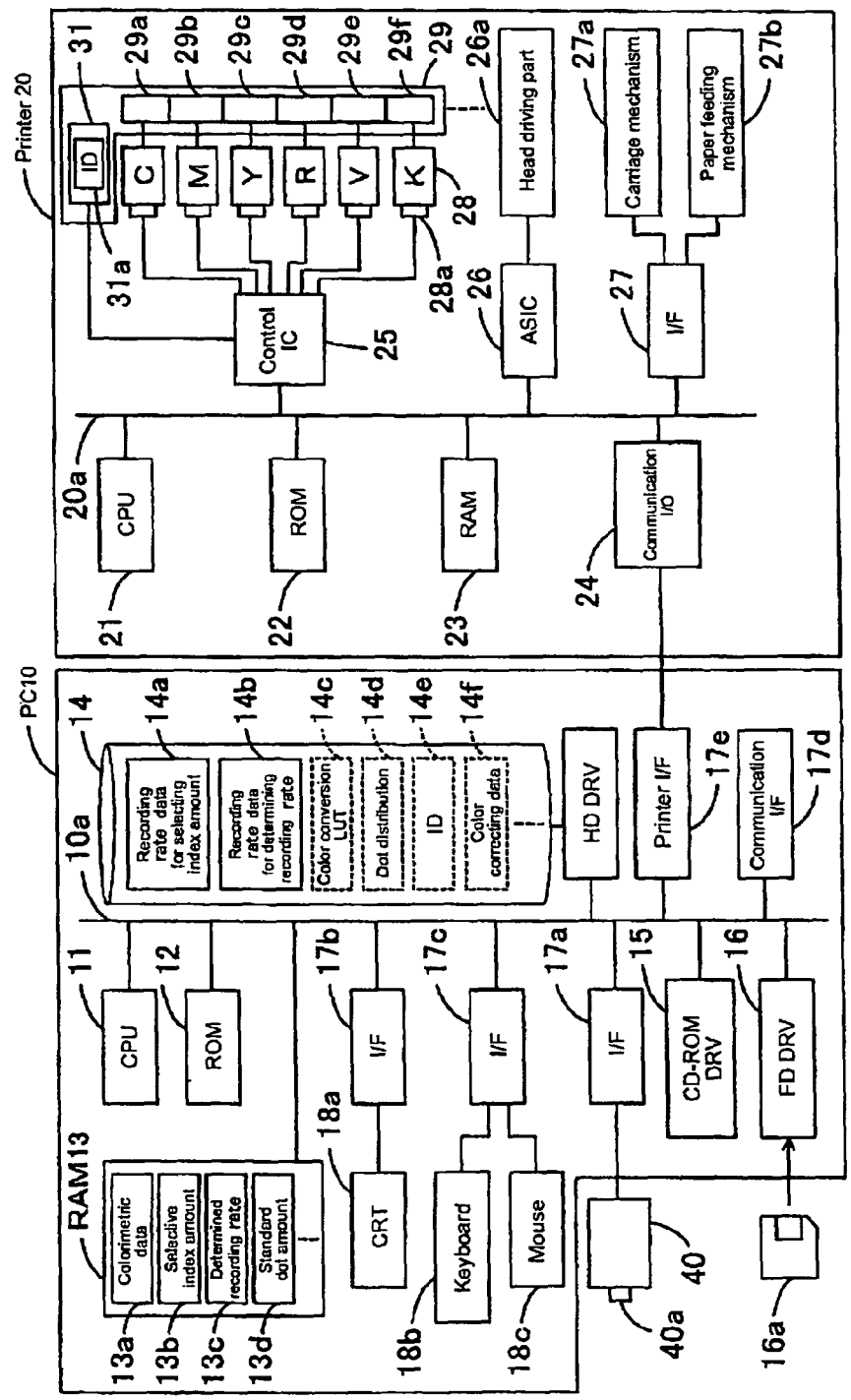
FIG. 3 is a block diagram showing the configuration of the printing system.
Figure 19:
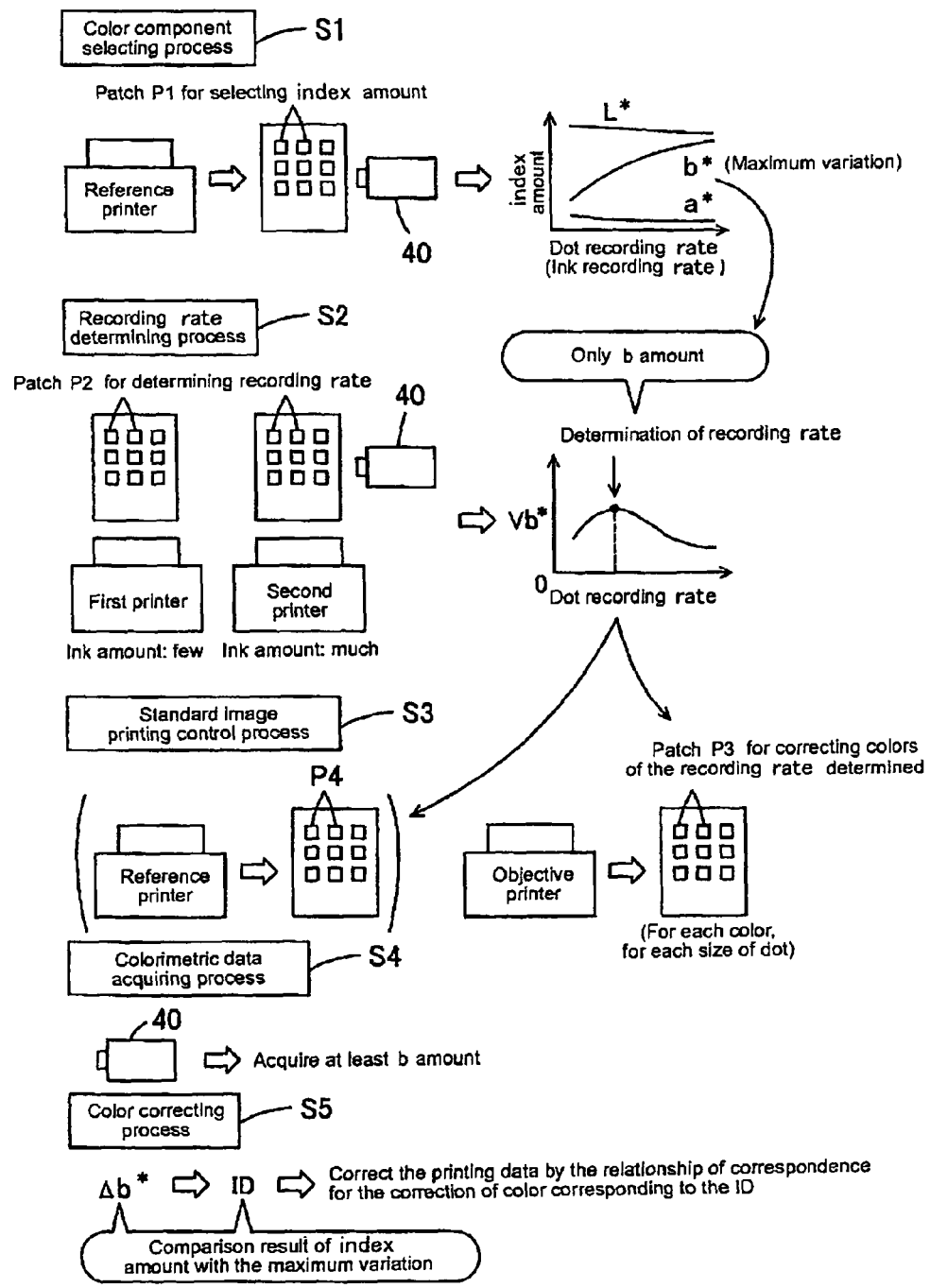
FIG. 19 is an illustration showing schematically the color correction method from a different viewpoint from the color correction method shown in FIG. 1.

The embodiments of the present invention will be described below according to the following order:
(1) Description of the configuration of the color correcting system and the color correcting method
(2) Printing control process
(3) Color correcting process
(4) Variants
    (1) Description of the Configuration of the Color Correcting System and the Color Correcting Method
FIGS. 1 and 19 are illustrations schematically showing a color correcting method constituting an embodiment of the present invention, FIG. 2 is a block diagram showing the outline of the color correcting system suitable to carry out the present color correcting method, FIG. 3 shows a printing system consisting of a personal computer (PC) 10 serving as a color correcting device and a color control device of the present invention in the present embodiment, an ink jet printer 20 capable of printing color serving as a printing device (printing unit) and the like. It is needless to say that the computer used in the present invention is not limited to a PC.

The present color correcting system is based on the premise that it will be used in a production factory of printers, and a PC 10 is connected with a colorimeter 40, and is to be connected successively with printers subject to calibration (hereinafter referred to as "objective printers"). And it will be connected with a reference printer (reference printing device) serving as the reference, the first printer (the first printing device) of which the amount of ink adhering on the printing medium is relatively few, the second printer (the second printing device) of which the amount of ink adhering on the printing medium is more than that of the first printer. And the objective printers will be calibrated by referring to the colors of the images for printing reproduced on the printing medium by the reference printer as the reference colors.

In the PC 10, a CPU 11 constituting the core of calculation operation controls the whole PC through a system bus 10*a*. This bus 10*a* is connected with a non-rewritable semiconductor memory ROM 12, a rewritable semiconductor memory RAM 13, a CD-ROM drive 15, a flexible disk (FD) drive 16, various interfaces (I/F) 17*a-e*, and the like. It is also connected with a hard disk (HD) 14 which is a magnetic disk through a hard disk drive. As for the printing system including a color correcting device, the RAM 13 stores colorimetric data 13*a*, data representing specified selective index amount 13*b*, determined ink recording rate 13*c*, standard dot amount data 13*d*, and the like.

The HD 14 stores an operating system (OS), application programs (APL) and the like, which are transferred at the time of execution as required to the RAM 13 for execution by the CPU 11 to be executed. In the case of the printing system including the color correcting device of the present invention, the HD 14 stores the color correcting program of the present invention, recording rate data 14*a* and 14*b*, various threshold values and the like. A colorimeter 40 connected with the I/F 17*a* (for example USB I/F) can obtain L amount, a amount and b amount (color value) corresponding to a plurality of color components L, a, b based on the Lab table color system according to the CIE (1976) standard by directing its color detecting unit 40*a* to the object of measuring color, and can output the L amount, the a amount and the b amount to the PC 10. Here, the CIE Lab color space (specified color space) is uniform color space not depending on devices and consists of a plurality of color components L, a, b. Incidentally, L is a color coordinate representing luminosity (brightness) and a, b are ones representing hue and saturation. Needless to say, the color spaces to be measured may be CIE XYZ color space, CIE Luv color space, RGB color space, and so forth.

On the other hand, in the case of printing systems including the printing control device of the present invention, the HD 14 is defined as a storage area for storing the printing control program of the present invention, a color conversion LUT (color conversion table) 14*c*, dot distribution table (dot type corresponding data) 14*d*, ID 14*e* obtained from the printer, a plurality of color correcting data considered as primary LUT 14*f*, various threshold values and the like. In this case, a digital camera and the like may be connected in the place of a colorimeter 40.

CRT I/F 17*b* is connected with a display 18*a* for displaying images corresponding to the data based on color image data, the input I/F 17*c* is connected with a keyboard 18*b* or a mouse 18*c* as operating input equipment, and the printer I/F 17*e* is connected with the printer 20 through for example serial I/F cable.

The printer 20 discharges from the printing head six colors of ink filled in six ink cartridges 28 respectively provided for each color of CMYRVK (cyan, magenta, yellow, red, violet, and black) to eject ink on the printing paper (printing medium) so that dots may be formed thereon. In this way, it prints images for printing corresponding to the printing data expressing a color image. Needless to say, a printer using light cyan, light magenta, light black, dark yellow, a colorless ink and the like may be used. And a printer not using ink of any of CMYRVK may be adopted. And it is also possible to adopt various types of printing devices such as bubble-jet printers wherein bubbles are generated in the ink passage before discharging the ink, a laser printer for printing images for printing on the printing medium by using a toner ink, and the like. The ink used by the printing device may be liquid or solid.

Each ink used in the present embodiment is defined as an ink made by mixing an aquatic solvent with a coloring material consisting of a fine pigment. However, it may be an ink made by mixing coloring materials with a stain, or it may be an ink using an oleaginous solvent.

The present printer 20 is connected with the CPU 21, ROM 22, RAM 23, communication I/O 24, control IC 25, ASIC 26, I/F 27 and the like through the bus 20*a*, and the CPU 21 controls various units according to a program written in the ROM 22.

A carriage running in the main scanning direction in the carriage mechanism 27*a* is loaded with each of the ink cartridges 28, and a printing head unit (printing head group) 29 is mounted thereon. The unit 29 is equipped with printing heads 29*a-f* provided for each of six types of ink CMYRVK and a non-volatile semiconductor memory 31. This memory 31 may take form of an EEPROM and the like capable of recording color adjusting ID (error information) 31*a* and the like used to correct printing data by the PC. Each printing head 29*a-f* incorporated into the printer can discharge an ink of the color corresponding to adhere on the printing paper, and the printer 20 uses printing heads 29*a-f* corresponding to each type of ink to form dots on printing paper and to print the images for printing.

Each cartridge 28 is provided respectively with a memory chip 28*a* consisting of, for example, RAM, and each memory chip 28*a* is electrically connected with a control IC 25.

The communication I/O 24 is connected with the printer I/F 17*e* of the PC 10, and the printer 20 receives raster data of each color transmitted from the PC 10 through the communication I/O 24. The ASIC 26 outputs impressed voltage data corresponding to the raster data to the head driving unit 26*a* while receiving and transmitting specified signals from and to the CPU 21. The head driving unit 26*a* generates impressed voltage patterns from the impressed voltage data to piezo-elements contained in the printing head 29*a-f* and causes the printing heads 29*a-f* to discharge six colors of ink by the dot unit. The carriage mechanism 27*a* and the paper feeding mechanism 27*b* connected with the I/F 27 causes the printing head unit 29 to perform the main scanning and the side scanning by turning pages from time to time and feeding successively the printing paper.

The printing heads 29*a-f* are provided with a plurality of ink jet nozzles for each color and include piezo-elements disposed for each such nozzle.

Figure 4:
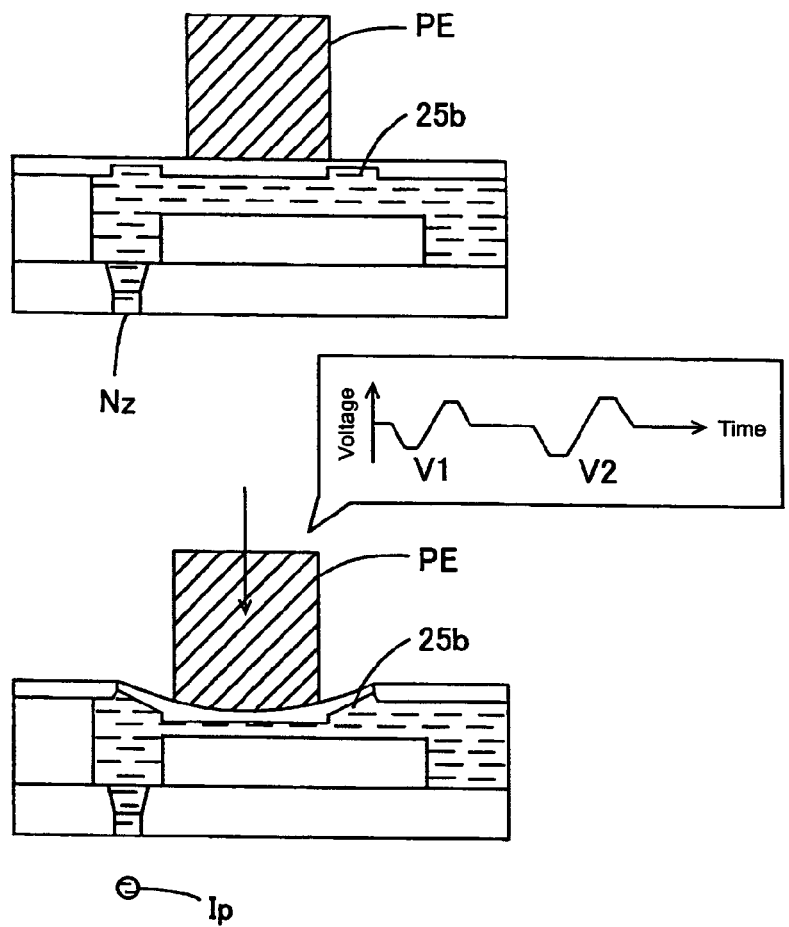
FIG. 4 is an enlarged illustration of the nozzle and its internal structure.

As shown in FIG. 4, the piezo-element PE is fixed at a position adjacent to the ink passage 25*d* leading ink to the nozzle Nz, and when a voltage of a specified time range is applied between the poles fixed on both ends of the peizo-element PE, it expands during the application of voltage and deforms one side of the ink passage 25*b*. As a result, the volume of the ink passage 25*b* contracts in response to the expansion of the peizo-element PE, and ink corresponding to this contraction forms an ink drop Ip and is discharged at a high speed from the top of the nozzle Nz to infiltrate into the printing medium forming thus a dot for printing.

The figure shows a driving waveform to form a specified number of types of dots of different ink amount, and the driving waveform V1, V2 during a specified period of time causes dots of different ink amounts to be formed. And as the larger the difference of voltage of the driving waveform is, the greater is the degree of expansion and contraction of the piezo-element, the dot grows larger. As shown in the lower part of the figure, the present printer 20 can form roughly speaking three types of dots, large, medium and small, in terms of ink amount (for example, this may be ink weight or ink volume) and each of large, medium and small dots may be broken down into three different types in terms of ink amount when they are printed on the printing medium. Therefore, for each color the printer discharges from the same printing head ink of different quantity in a plurality of different stages to form dots of sizes corresponding to the ink quantity of the plurality of stages. The raster data transmitted by the PC to the printer contain identification information for distinguishing the type of dots of nine different types (specified number), and the printer forms the type of dot corresponding to the identification information. And when raster data consisting of dot data expressing the type of dot for each raster is inputted, the printer forms dot of a plurality of different types of different ink amounts corresponding to raster data on the printing medium.

The PC 10 incorporating a printer driver for controlling the printer I/F 17e through the OS and the like executes various controls. The APL exchanges data with the hardware through the OS. The printer driver is operated when the printing function of APL is executed, can communicate bidirectionally with the printer 20 through the printer I/F 17e, receives the printing data from the APL through the OS, converts them into raster data and transmits the same to the printer 20.

And the color correcting program of the present invention may be constituted by any one of the OS, APL, OS and APL. The medium recording these programs may be, in addition to HD 14, CD-ROM, FD 16a, semiconductor memory and the like. And the communication I/F 17d may be connected with the Internet network, and the program of the present invention may be downloaded from the specified server and may be executed.

According to the color correcting method of the present embodiment shown in FIG. 1, the color of the objective printer having printed patches for color correction (standard images) is compensated by executing successively the steps S1-S5 and by correcting the printing data expressing color image.

In the step S1 for selecting index amount, in the first place the reference printer is connected with the PC 10, the standard dot amount data expressing a plurality of patches for selecting index amounts (images for selecting index amounts) P1 in which dot recording rates have been changed from a plurality of stages of dot recording rates (a type of recording rate of ink) contained in the specified recording rate data 14a for selecting index amounts stored in the HD 14 are generated for each color and dot size of the ink, in other words for each combination of color and dot type of the ink, and the PC 10 is made to control the reference printer to print each patch for selecting index amount P1 corresponding to the standard dot amount data on the printing medium. The standard dot amount data are data expressing the patches for selecting index amounts by the color and dot type of the ink as gradation data for each large number of picture elements in the form of dot matrix. Raster data are generated by proceeding to the specified half-tone and rasterization processing for standard dot amount data, and a plurality of patches for selecting index amounts P1 are printed by transmitting these raster data to the printer. These patches P1 are printed for each color and ink size (for each type of ink). Each patch P1 is a printed image made of primary color by using only a type of ink, and the whole print is a uniform plain image. Here, the recording amount of dots may be, for example, a number of dots formed by a unit area on the printing medium. In this case, when the weight of ink adhering on the unit area of the printing medium is chosen as the recording density of ink (a type of recording amount of ink), the recording amount of dot multiplied by the weight of a dot drop will be equal to the recording density of ink.

For the printing medium, a photographic paper and other glossy or coated paper is preferable from the viewpoint of obtaining stable ink coloring and compensating color with a high precision. However, an ordinary paper less glossy than coated glossy paper is preferable from the viewpoint of reducing the cost of calibration operation.

Then, the colorimeter 40 is used to measure the colors of each patch for selecting index amount P1 printed on the printing medium in the color space Lab to acquire colorimetric data consisting of L amount, a amount and b amount for each patch for selecting index amounts P1. Here, L amount, a amount, and b amount are index amounts corresponding to L, a, b defined by the color space CIE (1976) Lab specified also in the JIS Z8105. Of course, these L amount, a amount and b amount can be converted by a primary equation into gradation values wholly of the same specified number of gradations (for example 256 gradations). Each gradation value consists of a plurality of index amounts, and the color reproductiveness for the objective printer in relation to the reference color can be better obtained by giving all the plurality of index amounts for the color space at gradation values of the same number of gradations.

And the selective index amounts with the maximum variation in relation to the variation of the recording rates of dot are specified as the index amounts for correcting the printing data from among a plurality of index amounts obtained by the colorimetric data based on the colorimetric data acquired and the dot recording rates for which a plurality of patches for selecting index amounts have been printed. In the present embodiment, in order to facilitate the calibration operation, L amount, a amount and b amount are used as they are as a plurality of index amounts obtained from the colorimetric data. It is needless to say that values obtained from two or more combinations among a plurality of index amounts such as $(a^2+b^2)^{1/2}$, $(L^2+a^2+b^2)^{1/2}$ and the like may be used as index amounts obtained from colorimetric data. On such occasion, each index amount may be converted by a primary equation into gradation values of the wholly same number of specified gradations (for example 256 gradations), and in this case the objective printers can be assured of a better color reproductiveness in relation to the reference color.

In addition, as the selective index amount, two or more index amounts may be specified in the order of the magnitude of their variation in relation to the variation of the dot recording rate from among three or more index amounts.

In the step S1 of selecting color components of the color correcting method shown in FIG. 19, a plurality of patches for selecting color components P1 of which recording rate of ink is varied in relation to the reference printer are printed on the printing medium, the colors of each patch P1 printed are measured in the color space Lab to acquire colorimetric data consisting of L amount, a amount and b amount for each patch P1, and the selected index amounts with the maximum variation in relation to the variation of ink recording rate from among L amount, a amount and b amount are specified as the index amounts for correcting the printing data based on the colorimetric data and the recording rate of ink used to print the plurality of patches P1.

Figure 5:
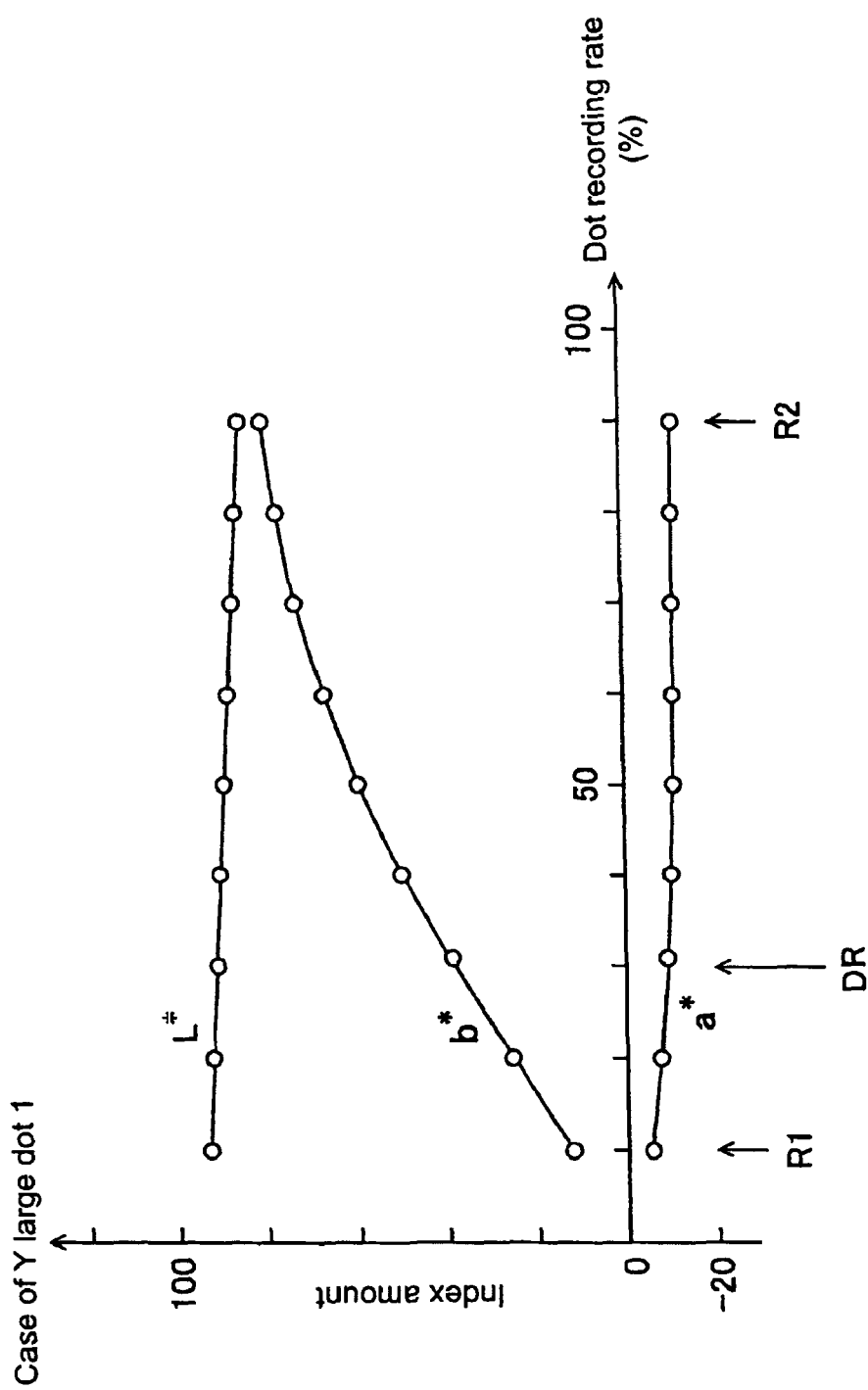
FIG. 5 is an illustration showing an example of the index amounts L, a, and b for the dot recording ratio.

FIG. 5 shows, with regards to Y large dot 1, an example of the result of measuring the ratio of the number of dots formed to the total number of picture elements in the specified area on the printing medium, in other words, the dot recording rate (a type of recording rate of ink) which is a relative value of the dot recording amount by printing the patches for selecting index amounts of nine stages ranging from 10% to 90% and increasing by step of 10% on a coated paper and measuring their colors in the color space Lab. Here, the horizontal axis represents dot recording rate (by %), and the vertical axis represents L amount, a amount, and b amount defining the color space Lab. In the example shown by the figure, b amount representing the maximum variation in relation to the variation in dot recording rate among the L amount, the a amount and the b amount is chosen as the selective index amount and is specified as the index amount for correcting the printing data.

For example, in the color and type of dot for specifying the selective index amount, the mutually different dot recording rate is represented by R1 (the first recording rate) and R2 (the second recording rate), and the index amounts L, a, and b at the time when the color of the patch for selecting the index amount having a dot recording rate R1 is measured are respectively represented by L1, a1, b1, and the index amounts L, a, b at the time when the colors of the patches for selecting index amounts of a dot recording rate R2 (R2>R1) are measured and respectively represented by L2, a2, and b2. When differences of index amounts for the patches for selecting both index amounts of R1, R2 $\Delta L=|L2-L1|$, $\Delta a=|a2-a1|$, $\Delta b=|b2-b1|$ are calculated, the value of $\Delta L$, $\Delta a$, and $\Delta b$ will grow larger as the difference of index amounts for the patches for selecting both index amounts of the recording rate R1 and R2 grows larger. Therefore, the index amount corresponding to the maximum calculated value from among $\Delta L$, $\Delta a$, and $\Delta b$ can be specified as the selective index amount. Moreover, when the minimum dot recording rate and the maximum dot recording rate from the varied dot recording rates are represented by the recording rate R1 and R2, the objective printer will acquire a good color reproductiveness in relation to the reference color.

Incidentally, it is possible to omit the present step S1 and execute the step S2 and the subsequent steps.

When the selective index amount is specified, in the step S2 for determining the recording rate, in the first place, the first printer wherein the amount of ink adhering on the printing medium is relatively small and the second printer wherein the amount of ink adhering on the printer medium is relatively large are connected with the PC 10, and for each color of the ink and type of dot, the PC 10 is made to control the first and second printers to print a plurality of patches for determining recording rates (images for determining the recording rate) P2 of which the dot recording rates are varied from the dot recording rate of a plurality of stages contained in the specified recording rate data for determining and stored in the HD. The standard dot amount data are data expressing the patches for determining recording rate by the color of the ink and the type of dot by the gradation data for each large number of picture elements in the form of dot matrix, and when as gradation data for each large number of picture elements in the form of dot matrix. Raster data are generated by proceeding to the half-tone and rasterization processing for the standard dot amount data. These plurality of patches P2 are printed by transmitting these raster data to the printer. These patches P2 are printed for each color and dot size (for each type of ink). Each patch P2 is a printed image made of primary color by using only a type of ink, and the whole print is a uniform plain image. Here, when the first printing head of which the weight of ink discharged is relatively heavy is fixed on the reference printer, it will make up the first printer, and when the second printing head of which the weight of ink discharged is heavier than the first printing head is fixed on the reference printer, it will make up the second printer.

In the step S2 of determining recording rate of the color correcting method shown in FIG. 19, the first printer and the second printer are controlled to print a plurality of patches of which the recording rate of ink has been changed for determining recording rates P2 on the printing medium, the colors of each patch P2 printed by the first printer that is a selected index amount are measured in the color space Lab to acquire the first selected index amount for each patch P2, and the colors of each patch P2 printed by the second printer that is the selected index amount are measured in the color space Lab to acquire the second selected index amount for each patch P2, and the ink recording rate with the maximum variation due to the variation of ink amount adhering on the printing medium occurring for each printer for the selected index amount from the recording rate of ink with which the plurality of patches 2 as the first and second selective index amount is determined as the standard recording rate.

Then, the colorimeter 40 is used to measure the colors of each patch for determining the recording rate printed by the first printer in the color space Lab to acquire the selective index amount selected in the step S1 for each patch P2 for determining the recording rate. The selective index amount acquired here is the first selective index amount (the first colorimetric data). And the colorimeter 40 is used to measure the colors of each patch P2 for determining the recording rate printed by the second printer in the color space Lab to acquire the selective index amount selected in the step S1 for each patch P2 for determining the recording rate. The selective index amount acquired here is the second selective index amount (the second colorimetric data). If the step S1 is omitted, however, the colorimetric data of each patch P2 printed by the first and second printers will be used as the first and second colorimetric data in the condition as they are.

And the recording rate with the maximum due to the variation in the amount of ink adhering on the printing medium occurring for each printer with regard to the selective index amount from the first and second colorimetric data and the dot recording rate of having printed a plurality of patches P2 for determining the recording rate is determined as the standard recording rate and is stored in the RAM 13. The recording rate 13c stored is determined for each color and type of dot, and is regarded as the dot recording rate of each patch P3 for correcting colors used for correcting the colors of the objective printer.

With regard to the large dot 1 for Y described above, as b amount is a selective index amount, b amount of the patch P2 for determining a plurality of recording rate printed by the first and second printers is acquired, and each b amount acquired and the dot recording rate are used to determine the dot recording rate of each patch P3 for correcting colors.

Figure 6:
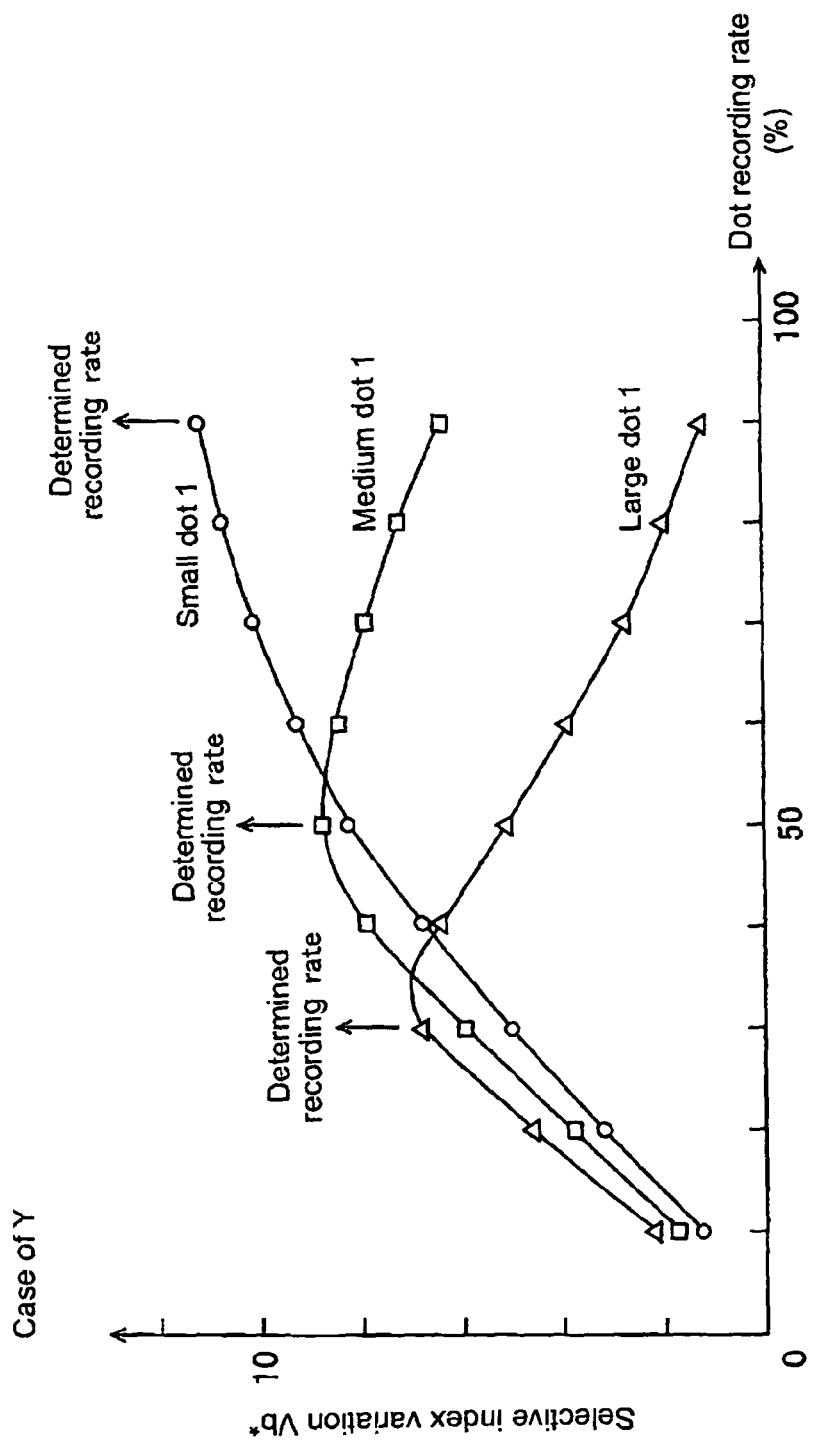
FIG. 6 is an illustration showing an example of variation of selective index amounts for the dot recording ratio by the type of dot.

FIG. 6 shows an example of the result of calculating the amount of variation of the selective index amount (b amount) for each dot recording rate with regard to Y large dot 1/medium dot 1/small dot 1 by printing the patches for selecting index amounts of nine stages ranging from 10% to 90% and increasing by step of 10% on a coated paper and measuring their colors in the color space Lab. Here, the horizontal axis represents dot recording rate (by %), and the vertical axis represents the amount of variation (Vb) of the b amount. In the example shown by the figure, in the case of the large dot 1, dot recording rate 30% has the maximum amount of variation Vb, and therefore the dot recording rate for the patch P3 for correcting colors (determined recording rate) is determined to be 30%. Likewise, in the case of the medium dot 1, the dot recording rate for the patch P3 for correcting colors is determined to be 50%, and in the case of the small dot 1, the dot recording rate for the patch P3 for correcting colors is determined to be 90%.

Generally, when each dot recording rate is represented by Ri (i is an integer of 2 or more) and the first and second selective index amount based on each recording rate of Ri is represented by S1$i$ and S2$i$, the selective index variation VS$i$ at each recording rate R$i$ can be calculated, for example, by VS$i$=|S2$i$−S1$i$|. And a dot recording rate R$i$ corresponding to the maximum VS$i$ from among a plurality of VS$i$ can be determined as the dot recording rate DR for the patch P3 for correcting colors.

And the L amount in the first and second colorimetric data while each dot recording rate is R$i$ may be respectively assumed to be L1$i$ and L2$i$, the a amount may be assumed to be respectively at a1$i$ and a2$i$, the b amount respectively at b1$i$ and b2$i$, and the selective index variation VS$i$ at recording rate R$i$ may be determined as being equal to the color difference, or VS$i$=$\{(L2i-L1i)^2+(a2i-a1i)^2+(b2i-b1i)^2\}^{1/2}$. Then, the difference of colors of each patch P2 printed by both printers can be more precisely calculated, and the acquisition of a good color reproductiveness for the objective printer in relation to the reference color can be better assured. In the case of a chromatic color ink, the selective index variation VS$i$ with each recording rate being R$i$ may be determined as the difference of chroma, or VS$i$=$\{(a2i-a1i)^2+(b21-b1i)^2\}^{1/2}$. Then, with regard to the chromatic color ink, the difference of colors of each patch P2 printed by both printers can be more precisely calculated, and the acquisition of a good color reproductiveness for the objective printer in relation to the reference color can be better assured.

It is needless to say that selective index amounts at each dot recording rate R$i$ may be obtained for three or more printing devices, and variations VS$i$ at each recording rate R$i$ may be values obtained by statistical calculations such as dispersion or standard deviation.

In addition, with regards to a plurality of printers, the weight of ink (ink amount) discharged from their printing heads may be measured, and the printer that discharges ink at the lower limit of variation of the ink weight may be called as the first printer, and the printer that discharges ink at the upper limit of variation of the ink weight may be called as the second printer. In other words, the first printer is a printer that makes ink adhere on the printing medium at the lower limit of variation of the ink weight, and the second printer is a printer that makes ink adhere on the printing medium at the upper limit of variation of the ink weight. Then, it will be more certain that the dot recording rate of which the variation will be the maximum due to variation of ink amount adhering on the printing medium with regards to the selective index amount will be determined, and the color reproductiveness of the objective printer in relation to the reference color can be improved.

Once the dot recording rate of the patch P3 for correcting colors is determined, in the step S3 of controlling the printing of the standard images, in the first place the reference printer is connected with the PC 10, and the standard dot amount data 13$d$ for expressing the patch for correcting the reference colors of the recording rate (standard image for reference) for each color of the ink and the type of dot from the recording rate 13$c$ determined during the step S2 will be generated, and the PC 10 will be made to control the reference printer to print each reference patch P4 for correcting the standard colors corresponding to the standard dot amount data 13$d$ on the printing medium. Or, the printers subject to calibration are connected with the PC 10, and the standard dot amount data 13$d$ for expressing the patch for correcting the colors of the recording rate (the standard image) for each color of the ink and the type of dot from the recording rate 13$c$ will be generated, and the PC 10 will be made to control the reference printer to print each patch P3 corresponding to the standard dot amount data 13$d$ on the printing medium. The standard dot amount data 13$d$ are data expressing patches for correcting colors by the color of the ink and the type of dot in the form of gradation data for each of a plurality of picture elements in the form of dot matrix, and for having the plurality of patches printed, the standard dot amount data may be treated with half-tone processing and rasterization, and the raster data thus generated may be transmitted to the printer.

In the step S3 for controlling the printing of the standard images according to the color correcting method shown in FIG. 19, the printer is controlled to print patches P3 and P4 of the standard recording rate in the ink described above on the printing medium.

Figure 7:
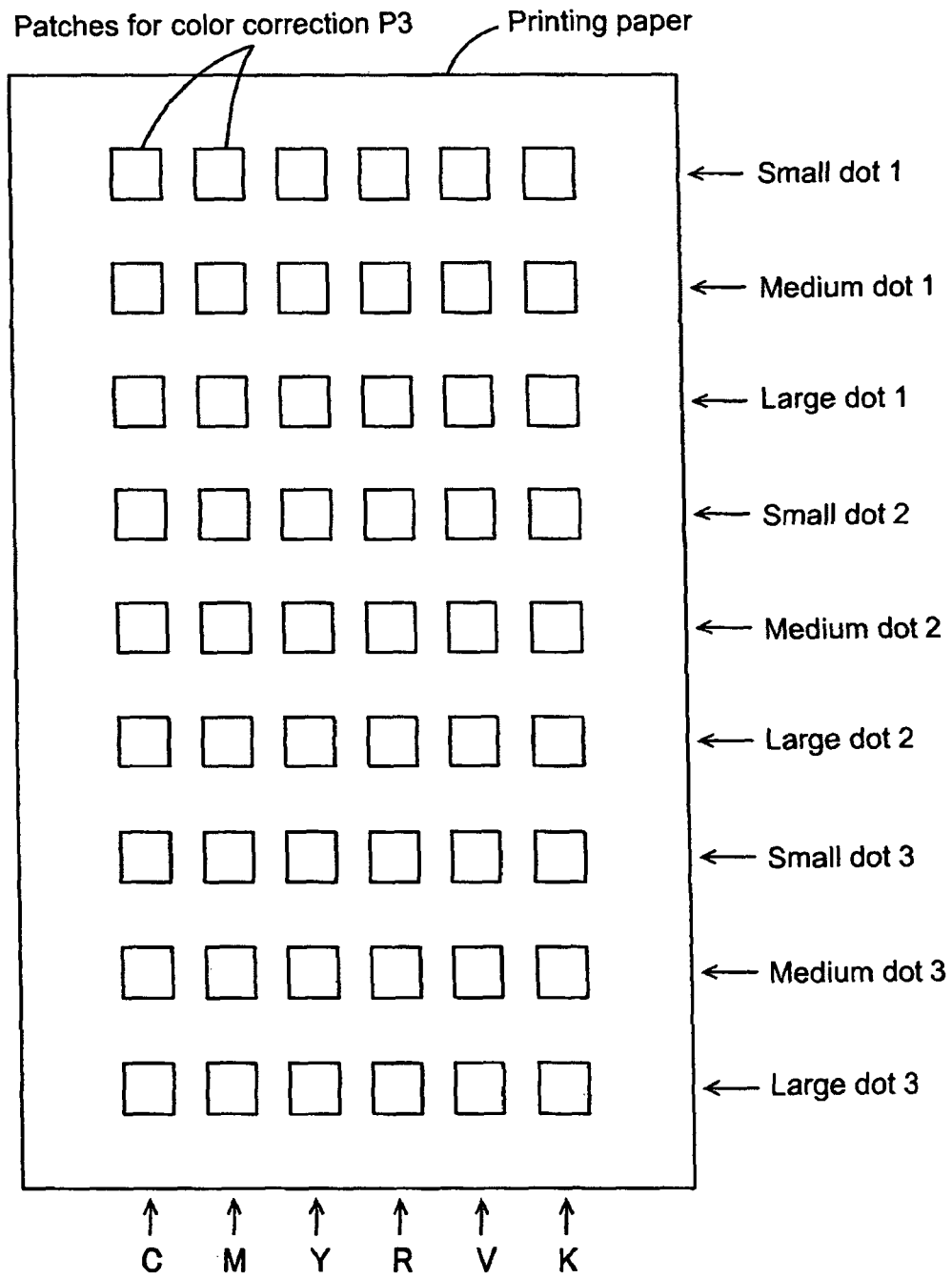
FIG. 7 is an illustration showing calibration sheet.

FIG. 7 shows a calibration sheet wherein a plurality of patches P3 for correcting colors is printed on a sheet of printing paper. And a calibration sheet wherein a plurality of patches P4 for correcting reference colors on the same type of printing paper is made in a similar way. Each patch P3 constitutes a printing image consisting of a primary color wherein only one type of ink is used, and the whole print is a uniform plain image. It is needless to say that a printed image consisting of secondary or more colors wherein two or more types of ink are used may be used for patches for correcting colors or for correcting the reference colors. The same plurality of patches P3 are deemed to be images of only one type of dot recording rate with the maximum variation in colorimetric data due to the variation of the amount of ink adhering on the printing medium occurring for each color of ink, the type of dot and each printer. According to the color correcting method shown in FIG. 19, a plurality of patches P3 are deemed to be images of only one type of standard dot recording rate for each color of ink and type of dot. The example of FIG. 7 shows that 54 patches P3 obtained by multiplying six (6) types of ink by nine (9) types of dots are printed. The printing of only one type of patch for correcting color for each condition and their use for correcting the colors of the objective printer enable to perform quickly calibration operation. Here, each patch P3 is printed in the dot printing amount determined in the step S2.

Incidentally, if each patch P4 conform to the conditions mentioned above is printed in advance by the reference printer on the printing medium, the step of having the reference printer print patches for correcting colors can be omitted in the step S3.

As described above, in the step S3, the objective printer is controlled to print on the printing medium the standard images of the dot recording rate with the maximum variation in colorimetric data due to the variation of ink amount adhering on the printing medium occurring for each color of ink, the type of dot and for each printer. In step S3 of the color correcting method shown in FIG. 19, the objective printer is controlled to print the standard images of the standard recording rate in each ink on the printing medium.

Once the patches P3 for correcting colors are printed, in the step S4 for acquiring colorimetric data, in the first place, the colors of each patch for correcting colors printed by the reference printer on the printing medium is measured by the colorimeter 40 in the color space Lab to acquire the colorimetric data of the patch for correcting colors of the dot recording rate for each color of ink and type of dot. The colorimetric data are the reference colorimetric data which are colorimetric data serving as the reference. And the colors of each patch P3 for correcting colors of the dot recording rate printed by the reference printer on the printing medium are measured by the colorimeter 40 in the color space Lab to acquire the colorimetric data of the patch P3 for each color of ink and type of dot. In the present embodiment, the colorimeter 40 outputs all the index amounts (L amount, a amount and b amount) to the PC, and therefore the PC is described as receiving all the L amount, a amount and b amount of each patch. However, it may acquire only selective index amount from among the L amount, a amount and b amount. Then, the structure and configuration of the programs and devices for carrying out the present color correcting method are simplified.

Incidentally, if the colorimetric data of each patch for correcting color printed in advance by the reference printer on the printing medium are prepared and made available, the step of obtaining the colorimetric data for each patch P4 printed by the reference printer can be omitted in the step S4.

Once the colorimetric data of each patch for correcting colors have been obtained, in the step S5 for correcting colors, the colorimetric data of both patches P4 and P3 are compared for each color of ink and type of dot, and a color adjusting ID 31a wherein the results of comparison are expressed is generated and is stored in the memory 31 of the printing head unit. When a PROM and the like is chosen for the memory 31, a ROM writer and the like may be used to store the ID 31a in the memory 31. Or, the ID may be stored in the ROM 22 of the printer.

For comparing the colorimetric data of both patches P3 and P4, the colorimetric data of the patches for correcting colors of the dot recording rate determined in the step S2 only are used for the comparison. Then, the ID 31a generated will constitute information wherein the comparison result of colorimetric data obtained by comparing colors of the patch for correcting colors of the dot recording rate with the maximum variation in colorimetric data due to variations in the amount of ink adhering on the printing medium occurring in each printer are expressed. The ID 31a created by the color correction method shown in FIG. 19 will be a piece of information showing the comparison results of only index amounts (color value) having the maximum variation in relation to the variations among a plurality of recording rate of dots. Of course, the ID 31a can be considered as the result of comparing the colorimetric data. As the example of FIG. 1 shows that the b amount is chosen as the selective index amount, the b amount of the patch P4 for correcting the reference colors and the b amount of the patch P3 for correcting colors are compared to obtain the value of Δb, and the comparison result ID is formed based on the value of the Δb acquired.

Here, when the selective index amount of the patch for correcting reference colors is represented by SO, the selective index amount of the patch for correcting colors is represented by SS, and the specified coefficient is represented by c (c>0), the value of the comparison result ID can be calculated by, for example, ID=c·(SS−SO).

Figure 8:
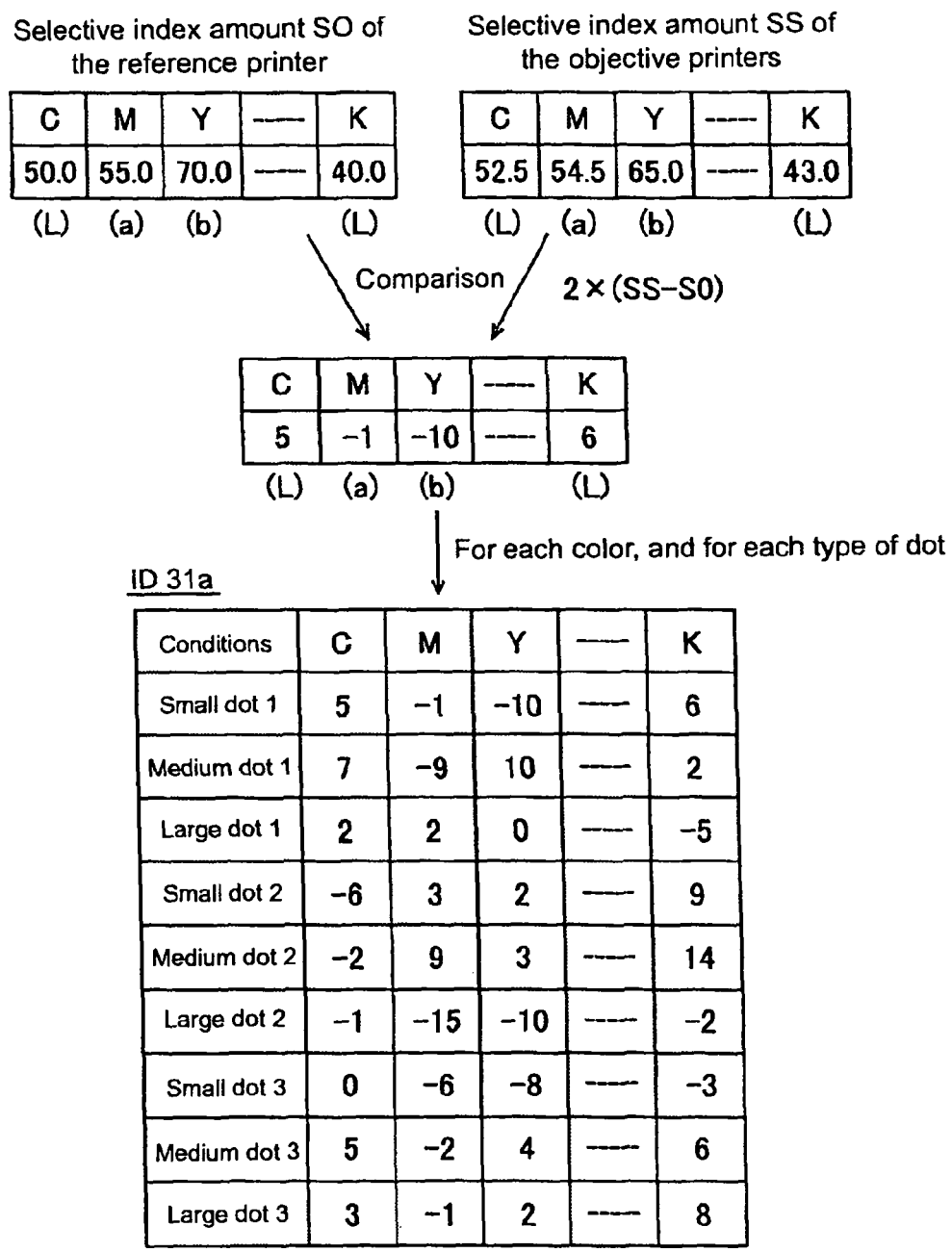
FIG. 8 is an illustration showing schematically the mode of determining color adjustment ID.

FIG. 8 shows how ID is determined. The upper row of the figure shows the selective index amounts SO and SS that can be obtained by measuring the colors of each patch P4 and P3 for each color when the type of dot is small dot 1. In the case of small dot 1, the selective index amount in the case where the ink is C is L amount, the selective index amount in the case where it is M is a amount, the selective index amount in the case where it is Y is b amount, and the selective index amount in the case where it is K is L amount. In this way, the selective index amount is specified for each color, and the selective index amount obtained by measuring color will be an index amount corresponding to the color of ink.

After the selective index amount SO and SS for both patches P4 and P3 have been obtained for each color and type of dot, the formula ID=c·(SS−SO) is applied to calculate the value of ID. The middle row of the figure shows the values of ID for each color in the case of small dot 1. Here, the values of ID for 54 types representing the combination of all six colors of ink and all nine types of dots are calculated. An example of values calculated for all the ID are shown in the lower row of the figure.

In this way, ID for each color of ink and type of dot can be generated. And each ID generated is stored in a specified area in the memory 31.

Incidentally, the step S4 may not be executed, and in the step S5 the patches for correcting colors of dot recording rate with the maximum variation in colorimetric data due to the variation in the amount of ink adhering on the printing medium and the patch for correcting the reference colors may be compared visually to generate an ID. On such an occasion, the reference printer is controlled to print a plurality of patches for comparison corresponding to each value of ID on the printing medium for each color of ink and type of dot, to compare the plurality of patches for comparison and patches for correcting colors, and to choose the value of ID corresponding to the patches for comparison of which the color is closest to the patches for correcting colors as the value of ID to be stored in the memory 31 to generate the ID.

When an ID has been stored in the memory 31, the printing data from which color data are expressed are corrected to the ones for compensating the color drifts of the images for printing printed by the objective printer by reading the ID 31 from this memory and using the same ID. This will enable to correct the printing data to make the printer that printed patches for correcting colors compensate colors.

(2) Printing Control Processing

Figure 9:
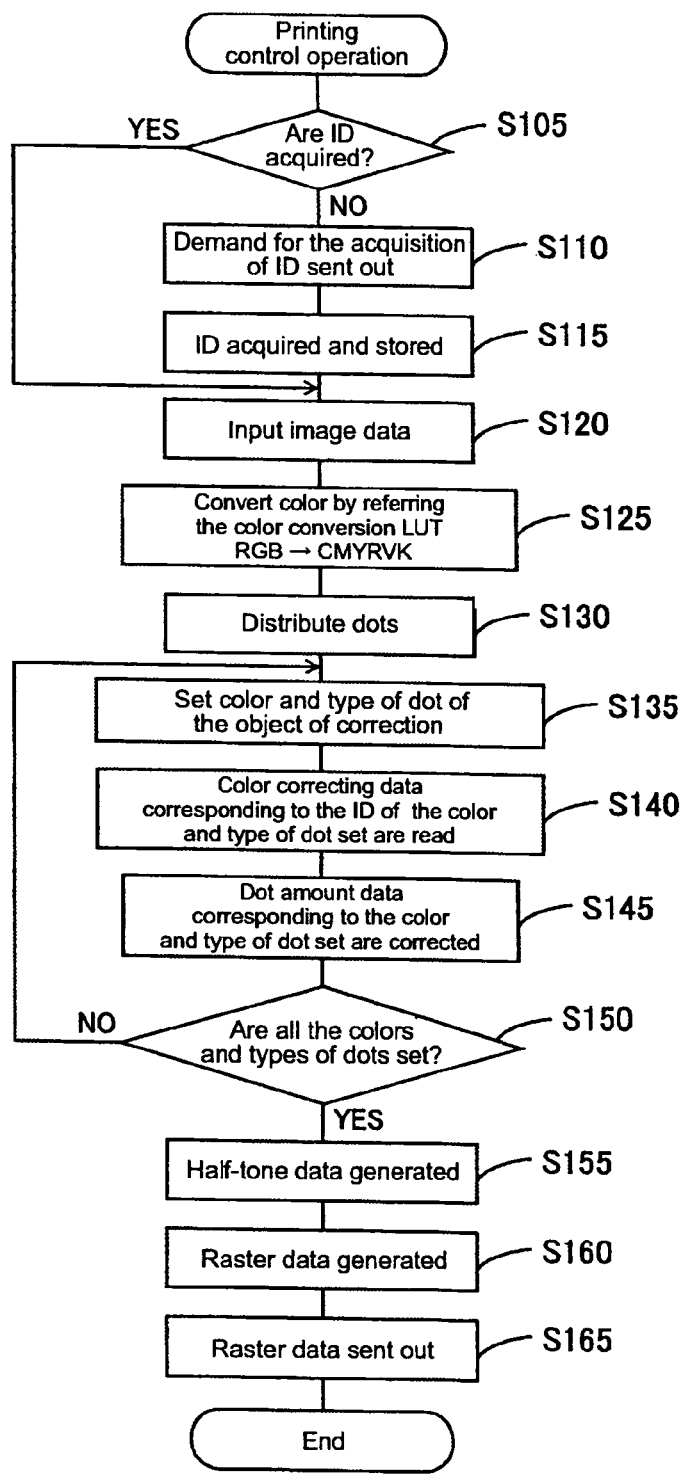
FIG. 9 is a flowchart showing the printing control process.
Figure 10:
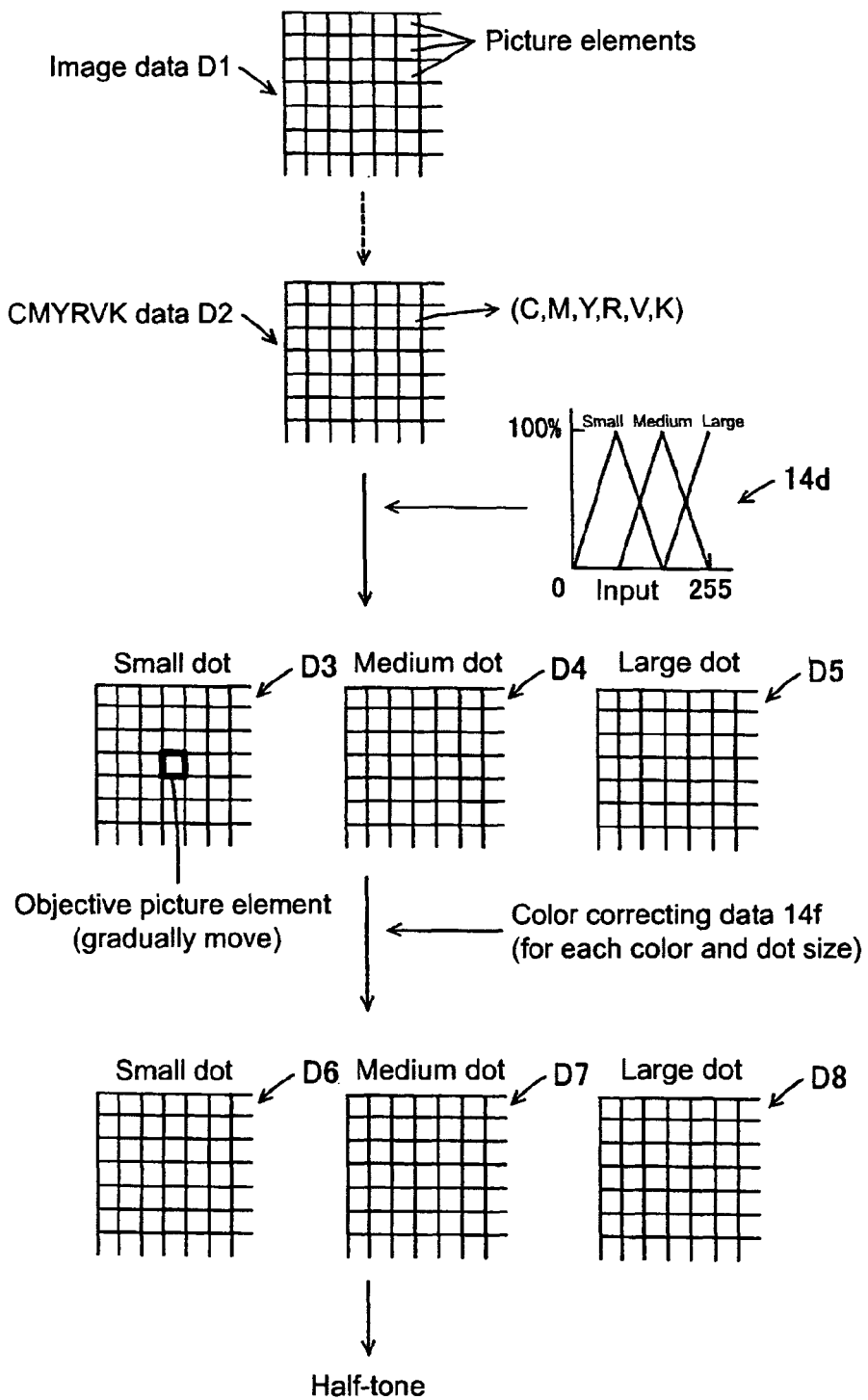
FIG. 10 is an illustration showing schematically the printing control process.
Figure 11:
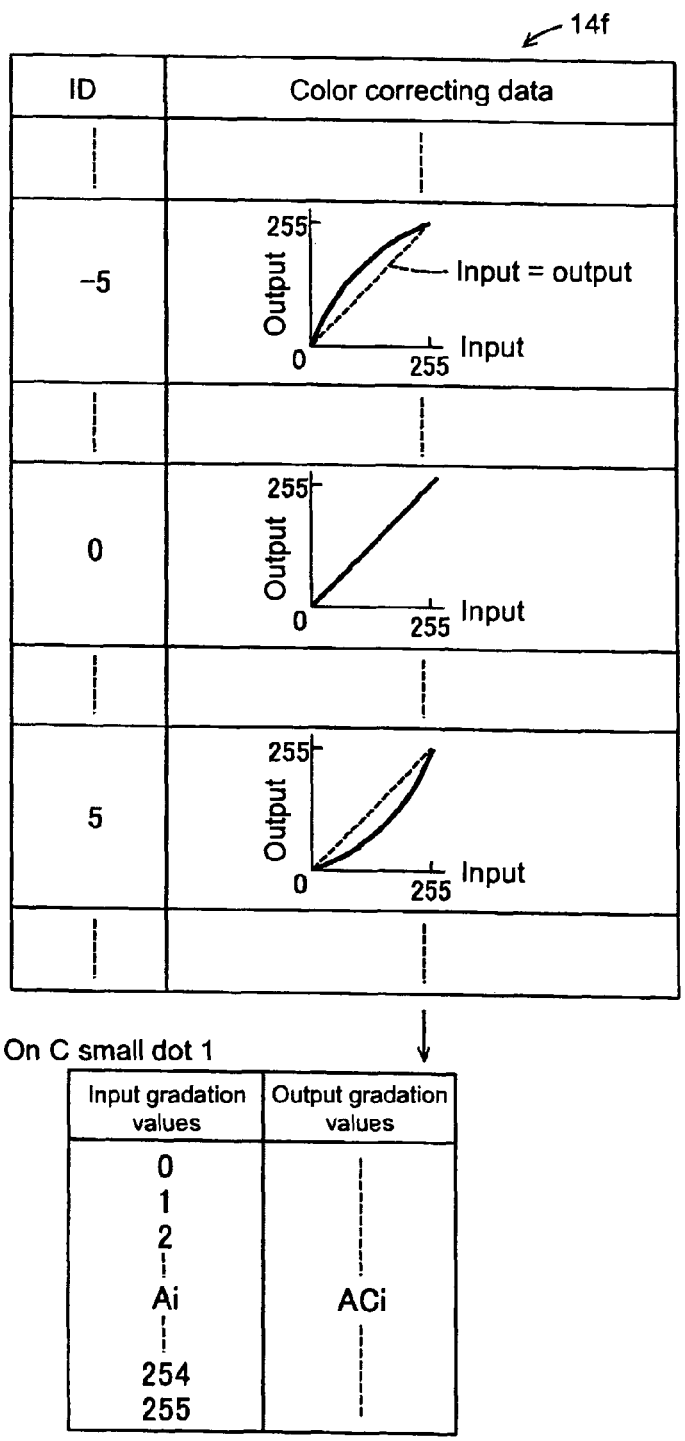
FIG. 11 is an illustration showing schematically the structure of a plurality of color correcting data.

FIG. 9 is a flowchart showing the process of correcting printing data by using ID 31a and executing printing control based on the corrected printing data. FIG. 10 is an illustration showing schematically the processing. FIG. 11 is an illustration showing schematically the structure of a plurality of color correcting data 14f stored in the HD 14. The color correcting data 14f corresponds to the ID of the stage for each stage of the value of ID and is stored in the HD, In the first place, the PC 10 judges whether ID 31a has been obtained from the printer 20 or not (step S105. Hereinafter, the word "step" will be omitted). If the condition is fulfilled, the PC 10 judges that it is no longer necessary to obtain ID from the printer and proceeds to S120. Incidentally, when the printer connected with the PC 10 has been changed, it will judge that there is no ID corresponding to the printer and proceeds to S120.

When the condition has not been fulfilled, it will make a demand for obtaining a color adjusting ID and transmit the same to the printer 20 (S110). Then, the printer 20 receives the demand for obtaining the same, and reads an ID 31a combining all the six types of ink and all the nine types of dots or all the 54 types from the memory 31 of the printing head unit and send them to the PC. Then, the PC obtains all the ID 31a and stores them in the HD 14 (S115). Thus, the color adjusting ID being incorporated in the printer, the user of the present printing system needs not input a separate color adjusting ID even if the printer has been replaced. Therefore, the present printing control device is convenient.

In S120, image data DI constituted by gradation data corresponding to a plurality of element colors separately by a large number (specified number) of picture elements are inputted, and the color image are converted into RGB data in wide area RGB color space wherein the gradation of color images is expressed in a plurality of pixels for each RGB (red, green and blue). At that time, data may be partially read or only pointers expressing buffer areas used for the delivery of data may be delivered. The color image data DI to be inputted are data expressing color images expressed by the gradation data for each of a large number of pixels in the form of dot matrix, and may be color image data constituted by RGB defined in the sRGB space, color image data constituted by YUV in the YUV table color system and the like. It is needless to say that they may be data based on the Exif2.2 standard (Exif is a registered trade mark of the Electronic Information Technology Industrial Association), data based on Print Image Matching (PIM:PIM is a registered trade mark of Seiko Epson Corp.) and the like. Since each component of color image data consists of a variety of number of gradations, color image data are converted into RGB data of each RGB having 256 gradations in a wide area RGB color space according to the definition of sRGB and YUV table color system and the like. The RGB data are printing data expressed by a plurality of element colors RGB.

Then, the RGB data, being objects of conversion, are converted into CMYRVK data D2 constituted by gradation data corresponding to the respective amount of use of the CMYRVK inks by making the gradation data of each picture element constituting the RGB data, by successively transferring the objective picture elements and by referring the color conversion LUT 14c (S125). The color conversion LUT 14c is an information table defining the relationship of correspondence between the RGB data and the CMYRVK data expressing the gradation of color images by the same number of picture elements for each CMYRVK with regards to a plurality of reference points. When the CMYRVK data matching with the RGB data are not stored in the color conversion LUT, CMYRVK data corresponding to a plurality of RGB data close to the RGB data inputted are obtained, and are converted into the CMYRVK data corresponding to the RGB data by volume compensation and other compensatory calculation. The CMYRVK data D2 are, like the RGB data, printing data expressing the color images by gradation data for every large number (specified number) of picture elements in the form of dot matrix, and are CMYRVK data of 256 gradations each expressing the amount of use of each ink discharged from the printing head of the printer 20.

Then, the gradation data by the color CMYRVK constituting the CMYRVK data after the color conversion (input gradation data) are converted into dot amount data expressing the amount of dots formed of a plurality of types of different ink by the type of dot (output gradation data) with reference to the dot distribution table 14d, the gradation data of each picture element constituting the CMYRVK data being chosen as the object of conversion and the objective picture elements being made to move successively. In this way, a dot distributing process is carried out (S130). In the present embodiment, color drifts are compensated by means of ID for correcting dot amount data (printing data).

As shown in the upper row of FIG. 12, the dot distribution table 14d is an information table that prescribes the relationship of correspondence between an input gradation data showing the amount of ink used in the printer and an output gradation table showing the amount dots formed by the type of dot. The table 14d is created for each color and stores the output gradation values showing the amount of dots formed in each gradation of the input gradation values by the type of dot. In FIG. 10, the horizontal axis represents the input gradation value and the vertical axis represents the relative value of the output gradation value, and shows schematically the dot amount data of each small, medium and large dot. The present embodiment provides three types of setting modes for the size of dot. Thus, in response to each setting mode 1-3, the dot distribution table 14d contains the output gradation data D11 referred at the time of forming small dot 1, medium dot 1 and large dot 1, the output gradation data D12 referred at the time of forming small dot 2, medium dot 2 and large dot 2, and the output gradation data D13 referred at the time of forming small dot 3, medium dot 3 and large dot 3.

In the dot distribution process, the gradation data are distributed into a plurality of dot use amount types corresponding to the setting modes 1-3, and as shown in FIG. 10, dot amount data for small dots D3, dot amount data for medium dots D4 and dot amount data for large dots D5 are generated. These dot amount data D3-D5 are, like the CMYRVK data, data expressing color images by gradation data for every large number (specified number) of picture elements in the form of dot matrix, and are data of 256 gradations for each CMYRVK expressing the amount of ink used for each dot discharged from the printing head of the printer 20.

However, even if dot amount data at this stage are used to have the printer print, the colors of the images printed on the printing medium may contain delicate errors. This results from shifts in the weight of ink discharged from each array of printing nozzles and delicate variation in voltage applied to the printing head when it is incorporated into the printer. And depending on this variation of voltage and the condition of the printing head incorporated, the dot printed on the printing medium sometimes crack and fail to be roughly circular, and as a result the color of the printed image sometimes develop delicate variations. Therefore, in order to compensate such variation in color, the dot amount data are compensated.

When each dot amount data is generated, the color and type of dot serving as the object of correcting the dot amount data are set (S135). For example, the objective colors and types of dots may be set from among all the 54 types by relating all the 54 types of inks and dots with different values, and renewing successively the values of pointers storing such values. Then, ID 14e of the color and type of dot set are read from the HD, the color correcting data corresponding to the value of ID 14e are specified from among a plurality of color correcting data 14f stored in the HD, and the color correcting data are read (S140). And the dot amount data of the objective picture elements are corrected with reference to the color correcting data read in S140 and the corrected dot amount data D6-D8 are generated, the gradation data of each picture element constituting the dot amount data corresponding to the color and type of dot chosen as the object of conversion and the objective picture elements and made to move successively (S145).

When the value of ID is negative, the degree of coloring on the printing medium of the objective printer is weaker than that of the reference printer. Therefore, as shown in FIG. 11, in order to intensify the degree of coloring of the printed image, the color correcting data are, as an overall trend, adjusted to produce larger output gradation values than the input gradation values. Therefore, the dot amount data characterized by colors and type of dot of positive ID values have, as a general trend, their gradation values largely corrected by referring such color correcting data. On the other hand, when the ID has positive values, the objective printer has a greater degree of coloring on the printing medium than the reference printer. Therefore, as shown in the figure, in order to reduce the degree of coloring of the images for printing, the color correcting data are, as a general trend, adjusted to reduce the output gradation values than the input gradation values. Therefore, the dot amount data of which the colors and types of dots have positive ID values are, as a general trend, corrected towards smaller gradation values by referring such coloring correcting data. This will enable the printing device having printed patches for correcting colors to compensate its colors.

Then, the question of whether all the colors and types of dots have been set or not is judged (S150), and if the conditions have not been fulfilled, the steps S135-S150 are repeated, and when the conditions have been fulfilled, the process passes to S155.

In S155, dot amount data for each size of dot are processed by the specified half-tone process including error diffusion method, dither method, density pattern methods and the like to generate half-tone data by CMYRVK of the same number of picture elements as the number of picture elements of the CMYRVK data. The half-tone data are data wherein the state of dot formation is expressed by the presence or absence of dot formed. For example, the presence of dot formed is represented by a gradation value "1" and the absence of dot formed is represented by a gradation value "0". Thus, the half-tone data can be turned into threshold data corresponding to binary two gradations depending on the presence or absence of dot formed. Obviously, four gradation data and the like may be adopted.

And the half-tone data generated are rasterized as specified to rearrange them in the order used by the printer to generate raster data by the CMYRVK (S160), which are outputted to the printer 20 (S165) to terminate the flow. Then, the printer 20 receives the raster data expressing the color images, drives the printing head to discharge ink on the printing medium based on these data, and forms images for printing corresponding to the RGB data. As the raster data are data wherein color drifts are compensated by each of CMYRVK, images for printing are color images wherein color drifts are compensated. Here, as the color of the objective printer is compensated based on the color adjusting ID expressing the result of comparing the colorimetric data of patches for correcting colors actually printed by the objective printer on the printing medium and the reference colometrical data, no delicate errors occur in the colors of the images for printing due to delicate variation of voltage applied to the printing head. Therefore, the color reproductiveness of the printed image in relation to the reference color improves than before when the weight of ink only was compensated.

In this way, the printer can be controlled to print images for printing of a high image quality after compensation of color by inputting the RGB data and converting them into dot amount data so that the color of the images for printing may be compensated. In addition, if the printer can execute half-tone processing, multiple gradation CMYRVK data may be transmitted to the printer and the printer may correct the dot amount data.

(3) Color Correcting Process

And now, the process executed by the color correcting device usable for executing the present color correcting method will be described below.

Figure 13:
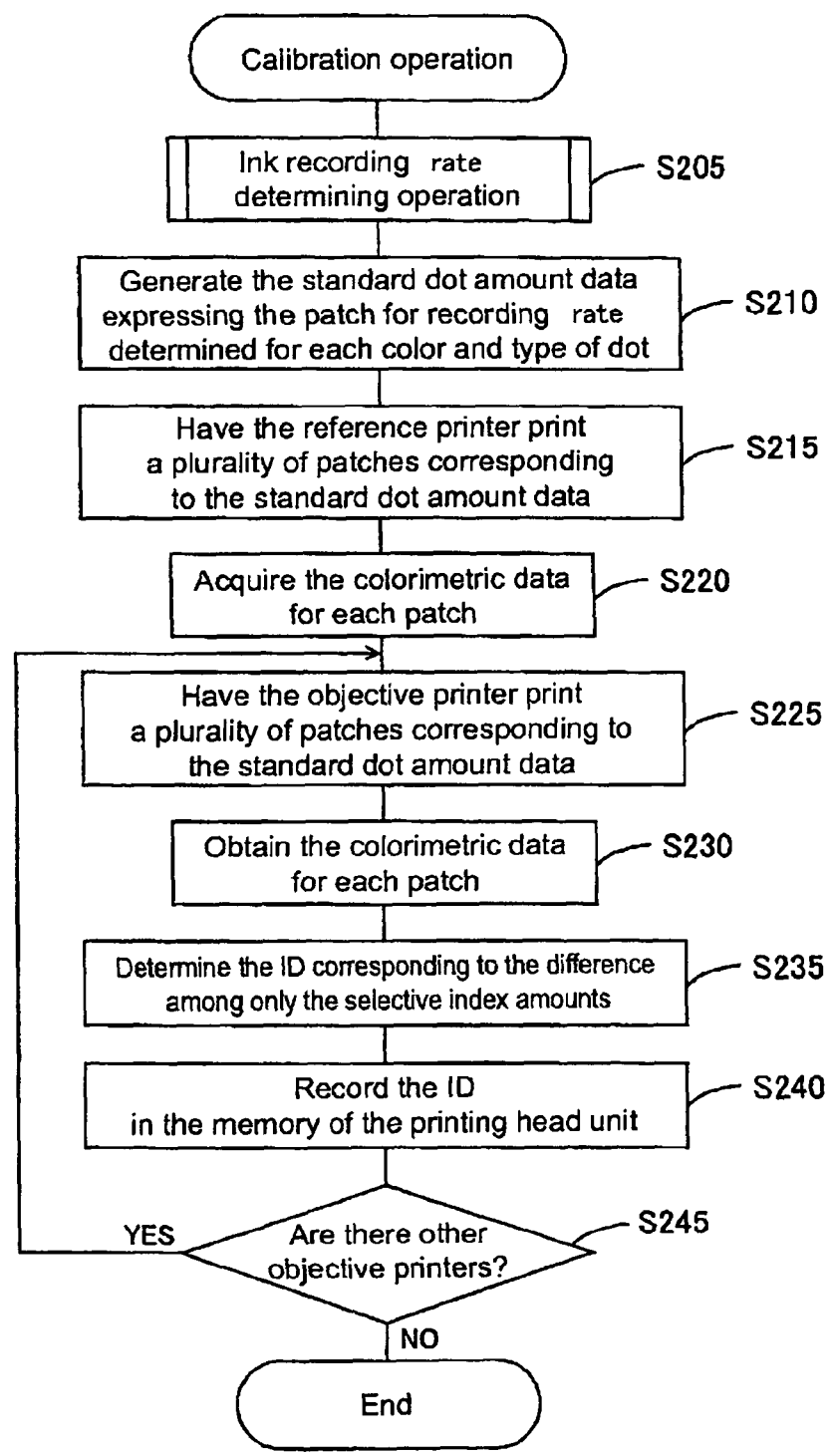
FIG. 13 is a flowchart showing the calibration process.
Figure 14:
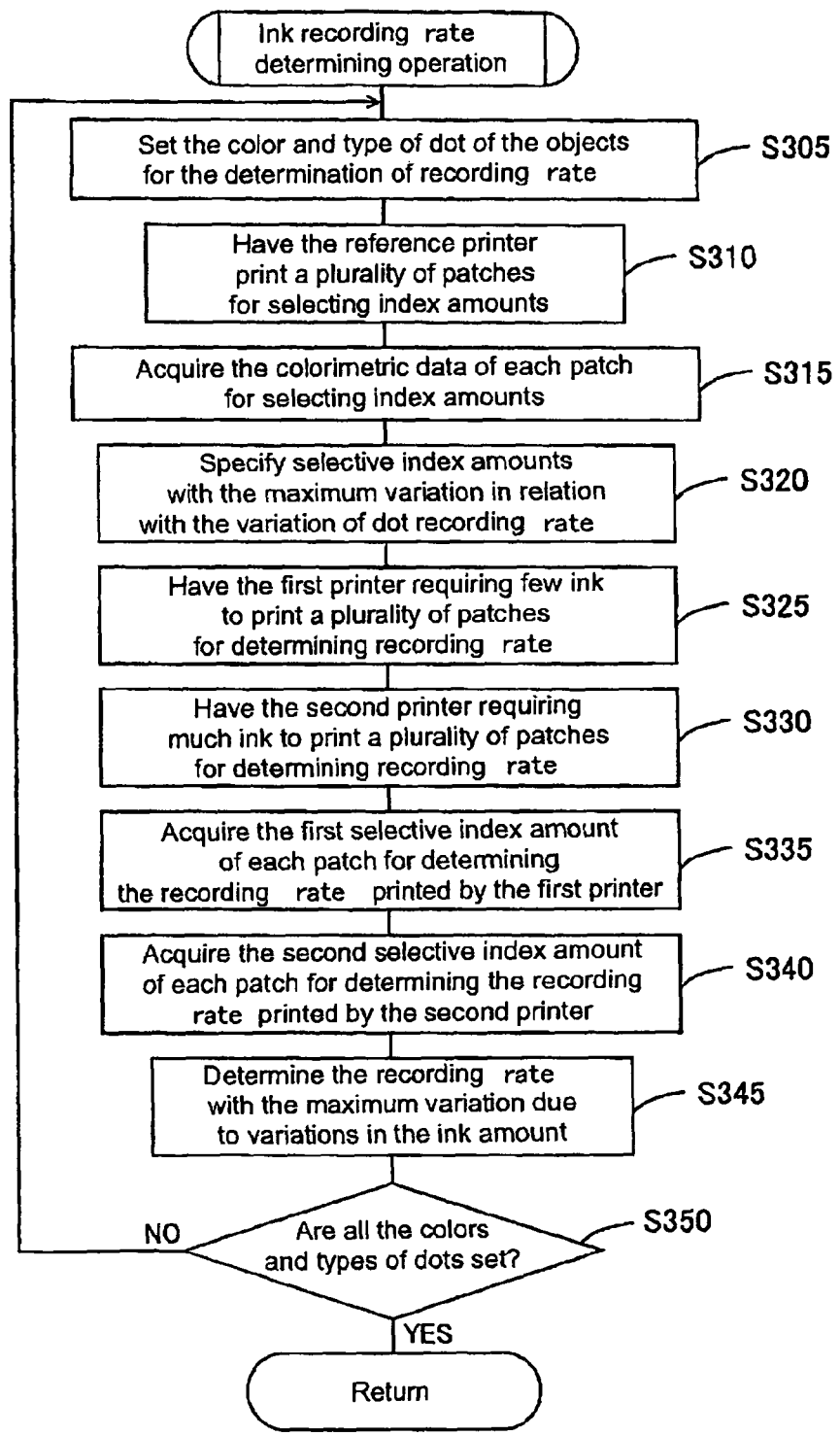
FIG. 14 is a flowchart showing the process of determining recording rates of ink.

FIG. 13 is a flowchart showing the calibration process executed by the present color correcting device, and FIG. 14 is a flowchart showing the process of determining ink recording rate in S205. These figures will be described as required with reference to FIG. 1 and the like. The present process and the PC 10 for executing the printing control process described above constitute various parts corresponding to each of the steps S1-S5, and S305-S320 correspond with the index amount selecting unit, S325-S345 correspond with the recording rate determining unit, S210-S215 and S225 corresponds with the standard image printing control unit, S220 and S230 correspond with the colorimetric data acquiring unit and S235-S240 and S105-S150 correspond with the color correcting unit.

In the first place, the process of determining ink recording rate is started, and the color and type of dot for determining the dot recording rate will be set by renewing the value of pointers wherein the value corresponding to each color and type of dot in S305 will be stored. Then, the standard dot amount data expressing a plurality of corresponding plain patches P1 for selecting index amount from a plurality of stages of dot recording rates (for example, dot recording rate R1=10%, R2=90%) constituting the recording rate data 14a for selecting the index amount 14a stored in the HD 14 are generated, and the standard dot amount data are used to print a plurality of patches P1 for selecting index amounts of which the dot recording rate is made different and printed on the specified printing paper. (S310). Furthermore, L amount, a amount and b amount which are printed colorimetric data for each patch P1 for selecting index amount are acquired from the colorimeter 40 (S315). For example, it is possible to make a system wherein a button for indicating that the color measurement operation of all the patches has ended is displayed on the display device, and when the button is operated by a mouse, a signal is sent out to the colorimeter to output the colorimetric data so that the colorimetric data outputted from the colorimeter may be received after the transmission thereof. The same applies hereafter. And as described above, the difference of index amount for the patches for selecting both index amounts of the dot recording rate R1 and R2 $\Delta L=|L2-L1|$, $\Delta a=|a2-a1|$, $\Delta b=|b2-b1|$ are calculated, and the index amount corresponding to the maximum calculated value from among each calculated amount $\Delta L$, $\Delta a$ and $\Delta b$, in other words a selective index amount with the maximum variation in relation to the variation of the dot recording rate is specified, and data 13b showing the specified selective index amount is temporarily stored in a RAM (S320).

When the selective index amount is specified, the corresponding standard dot amount data expressing a plurality of plain patches P2 for determining the recording rate are generated from a plurality of stages of dot recording rate constituting the recording rate data 14b for determining the recording rate stored in the HD (for example, dot recording rate Ri, i=1, 2, ..., 9, R1=10%, R2=20%, ..., R9=90%), and the first printer having a relatively small amount of ink adhering on the printing medium is made to print on the printing paper a plurality of patches P2 for determining the recording rate of which the dot recording rate is different due to the use of the standard dot amount data (S325). And the second printer having a relatively large amount of ink adhering on the printing medium is made to print on the same type of printing paper each patch P2 for determining the recording rate of the same dot recording rate Ri by using the same standard dot amount data (S330). Then, the colorimetric data of each patch P2 for determining recording rate printed by the first printer are acquired from the colorimeter 40, and the first selective index amount S1i is acquired according to the data 13b showing the selective index amount (S335). And the colorimetric data of each patch P2 for determining recording mount printed by the second printer are acquired from the colorimeter 40 and the second selective index amount S2i are acquired according to the data 13b (S340). And the selective index variation VSi=|S2i−S1i| for each dot recording rate Ri is calculated, and the recording rate Ri corresponding to the maximum VSi from among the calculated VSi, in other words, the recording rate Ri with the maximum variation in colorimetric data due to a variation in the amount of adhered ink may be determined as the dot recording rate DR for the patch P3 for correcting colors for the color and type of dot set, and is stored in the RAM 13 as the determined dot recording rate 13c (S345).

In addition, for turning the patch for determining recording rate into a dot recording rate (referred to as Rj) the color of which has not been measured, the first and second selective index amount (referred to as S1j and S2j) are estimated by polynominial equation approximity and the like, and the selective index variation $VSj=|S2j-S1j|$ at each dot recording rat Rj is also calculated, and the dot recording rate corresponding to the maximum selective index variation from among the calculated VSi and VSj may be determined as the dot recording rate DR for printing the patch for correcting color. Then, as the dot recording rate for printing the patch for correcting colors is determined carefully, a good color reproductiveness of the objective printer can be better assured.

When the dot amount data of the color and type of dot set are corrected, the question of whether all the colors and types of dots have been set or not is judged (S350), and when the conditions have not been fulfilled, S305-S350 are repeated, and when the conditions have not been fulfilled, the present process is terminated.

When the dot recording rate for printing the patches for correcting colors is determined, the standard dot amount data $13d$ expressing a plurality of plain patches for correcting colors corresponding thereto are generated from the dot recording rate $13c$ determined in the ink recording rate determining process for each color and type of dot, and are temporarily stored in the RAM 13 (S210). Then, the reference printer is controlled to print on the printing paper a plurality of patches P4 for correcting the reference colors corresponding thereto for each color and type of dot by using the standard dot amount data $13d$ (S215). Thereupon, each patch P4 for correcting the reference colors similar to the patch P3 shown in FIG. 7 is printed by the reference printer. And L amount, a amount and b amount which are the colorimetric data of each patch P4 printed are acquired from the colorimeter 40, and are temporarily stored in the RAM (S220). Needless to say, only the selective index amounts (referred to as SO) may be acquired.

Then, based on the standard dot amount data $13d$ described above, the objective printer is controlled to print a plurality of patches P3 for correcting colors corresponding thereto for each color and type of dot on the printing paper (S225). And then, each patch P3 for correcting colors shown in FIG. 7 is printed on the printing paper by the objective printer. Furthermore, L amount, a amount and b amount which are colorimetric data of each printed patch P3 for correcting colors are obtained from the colorimeter 40, and are temporarily stored in the RAM (S230). Needless to say, only the selective index amounts (referred to as SS) may be obtained.

When the colorimetric data for both patches P3 and P4 are obtained, the value $c \cdot (SS-SO)$ of the ID corresponding to the difference (SS-SO) of only the selective index amounts is calculated, and as shown in FIG. 8, the ID is determined for all the six types of ink and all the nine types of dots (S235). The ID will constitute a piece of information expressing the comparison results of colorimetric data resulting from the measurement of colors of colorimetric patches of dot recording rates with the maximum variation in colorimetric data due to variations in the amount of ink adhering on the printing medium occurring in each printer. And the chosen ID will be recorded in the memory 31 of the printing head unit of the objective printer. (S240)

Finally, the question of whether there are any other printers subject to calibration or not is judged (S245), and when the condition is fulfilled, S225-S245 are repeated, and when the condition is not fulfilled, the flow is terminated.

Then, when the objective printer is subjected to a printing control operation shown in FIG. 9, the dot amount data (printing data) for each color of ink and type of dot can be corrected so that the color of the printed image by the objective printer may be compensated, and the objective printer may be controlled to print the printed image corresponding to the corrected printing data on the printing medium.

Here, the relationship of correspondence for color correction between the dot amount data before correction and the corrected dot amount data may be specified as described below.

Specifically, the objective printer is controlled to print on the printing medium the patch for correcting colors with the maximum variation in colorimetric data due to variations in the amount of ink adhering on the printing medium occurring for each printer for each color of ink and each type of dot, the patches for correcting colors with dot recording rates with the maximum variation in colorimetric data printed on the printing medium are printed on the printing medium, the patches for correcting colors with the maximum variation printed on the printing medium and the patches for correcting the reference colors are compared, and by the result of comparison the dot amount data are corrected to specify the relationship of correspondence for correcting colors, and to specify the relationship of correspondence before and after the correction of the dot amount data for correcting the colors of the objective printer. The patch for correcting colors and the patch for correcting the reference colors may be compared visually. However, the colors of the patch for correcting colors with the maximum variation in dot recording rate printed on the printing medium may be measured in specified color spaces such as the color space Lab to obtain the colorimetric data of the patch for correcting the colors, and the colorimetric data obtained and the reference colorimetric data may be compared. And the relationship of correspondence for correction of colors before and after the correction of the dot amount data may be specified based on the result of such comparison.

And the relationship of correspondence for the correction of colors in the color correcting method shown in FIG. 19 may be specified as described below.

Specifically, the objective printer is controlled to print on the printing medium the patch for correcting colors for the standard recording rate for each color of ink and each type of dot, the colors of the patch for correcting colors printed on the printing medium in the specified color space consisting of a plurality of color components as their index amounts such as the color space Lab are measured to acquire the colorimetric data of the patch for correcting the colors. And the colorimetric data acquired and the reference colorimetric data are compared. And when the colorimetric data obtained and the reference colorimetric data are compared, and based on the results of comparison, the dot amount data are corrected, the comparison results of only the index amounts with the maximum variation in relation to the variation amount of dot from among a plurality of index amounts are used to specify the relationship of correspondence for correcting colors before and after the correction of the dot amount data to compensate the colors of the objective printer.

Then, the PC 10 for executing the printing control operation shown in FIG. 9 becomes a printing control device for controlling the objective printer to correct the dot amount data by the relationship of correspondence for the correction of colors described above and to print the printed image corresponding to the corrected dot amount data.

Incidentally, the printing data for correction at the time of compensation of color may include the dot amount data, half-tone data, raster data and the like. In the case of these data, the color of images for printing may be compensated by adjusting the number of dots to be formed on the printing medium at a ratio corresponding to the ID value. And when the size of dot is only one type, the CMYRVK data immediately after the color conversion may be printing data subject to correction. In the case of the CMYRVK data, in the same way as the correction of the dot amount data mentioned above, the colors of the images for printing may be compensated by correcting with reference to the color correcting data corresponding to the ID values. It is needless to say that, even in the case of RGB data before color conversion, the colors of images for printing may be compensated by preparing a color correcting LUT prescribing the relationship of correspondence between the RGB data before correction and the corrected RGB data corresponding to each value of the ID, and by correcting the RGB data by referring the color correcting LUT corresponding to the ID values.

And when the dot size is only one type, besides the dot recording ratio, the recording density of ink represented by the weight of ink adhering on each unit area of the printing medium, the ratio of ink weight adhered on all the picture elements on the printing medium of the same area as the weight of ink when ink dots are formed on the whole area of the printing medium, in other words the recording ratio of ink and the like may be the recording rate of ink. And the colors of the printer may be compensated by determining the recording rate of ink with the maximum variation in colorimetric data due to variations in the amount of ink adhering on the printing medium, by obtaining the colorimetric data of the each patch for correcting colors printed, and by correcting the printing data based on the results of comparing the colorimetric data.

As described above, as the results of comparing the colorimetric data of the patches for correcting colors of recording rates of ink with the maximum variation in colorimetric data and the reference colorimetric data are used to correct the printing data when color drifts in printing devices due to variation in the amount of ink adhering on the printing medium are compensated, the printing data are corrected with a high precision. And as the printing data may be corrected by using the result of comparison of the colorimetric data of the patch for correcting colors of only the recording rate of ink with the maximum variation and the reference colorimetric data, the calibration operation of the printing device can be speeded up.

According to the color correcting method shown in FIG. 19, as the printing data may be corrected by using the results of comparing only selective index amounts of the maximum variation, complicated calculations are unnecessary at the time of the calibration operation of the printing device. Therefore, the calibration operation can be speeded up.

And as the results of comparing the selective index amounts with the maximum variation in the recording rate of ink among a plurality of index amounts in the color space serving as the basis of color measurement, the calibration operation can be speeded up in this respect also. In addition, as the printing data can be corrected by using the results of comparing only selective index amounts of the maximum variation from a plurality of index amounts in specified color spaces, complicated calculations are unnecessary at the time of the calibration operation.

In addition, as the printing data are corrected by using the colorimetric data obtained by measuring the color of the standard images printed on the printing medium, no delicate errors in the color of printed image occurs due to delicate variation in voltage applied to the printing head, and the color reproductiveness of the objective printing devices can be improved in relation to the reference colors. And as the results of comparing the selective index amount of patches for correcting colors of the recording rate of ink with the maximum variation are used, in this respect also the color reproductiveness of the objective printing device can be improved in relation to the reference colors.

(4) Variant

In the meanwhile, the computer and peripherals that can be used in carrying out the present invention can have various configurations. For example, the printing device may be one integrated with the computer. It may be a printing device designed to print only monochrome images. The flow mentioned above may be executed partially or wholly by a printing device or a dedicated color image processing device.

Figure 15:
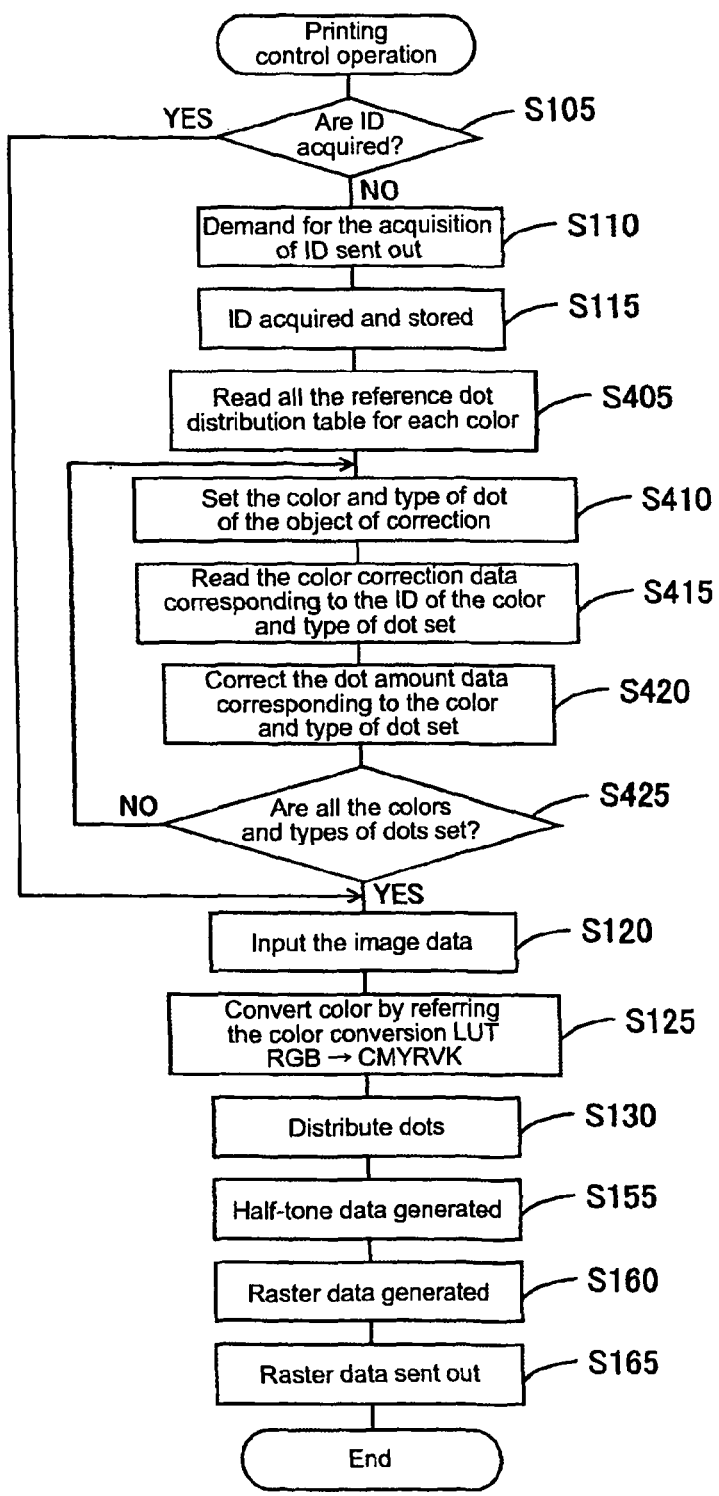
FIG. 15 is a flowchart showing the printing control process in a variant.

Or, as shown in FIG. 15, for correcting dot amount data, the dot distribution table 14*d* itself may be corrected and the dot amount data may be corrected by referring the corrected table. And although in S105-S130 and S155-S165 the situation is roughly the same as FIG. 9, after the ID is stored in the HD 14 in S115, the process proceeds to S405.

In S405, the dot distribution tables 14*d* created for each color are wholly read from the HD. Then, the colors and types of dots for correcting the data of the table 14*d* are set (S410), and the ID 14*e* of the colors and types of dots set are read from the HD, and the color correcting data corresponding to the value of the ID 14*e* from among a plurality of color correcting data 14*f* stored in the HD are specified and the color correcting data are read (S415). Then, the data in the table 14*d* corresponding to the color and type of dot set are corrected by referring the color correcting data read (S420).

As shown in the lower row of FIG. 11, the color correcting data 14*f* are regarded as an information table prescribing the relationship of correspondence between the input gradation values $A_i$ (i is an integer between 0-255) and the output gradation values for each color and type of dot with respect to each gradation (all the gradations) of the input gradation values $A_i$. In the case of gradation values for C small dot 1, the output gradation values $AC_i$ corresponding to the input gradation values $A_i$ are prescribed as shown by the solid line in the upper row of the figure. Such relationship of correspondence is also prescribed for the types of dots other than small dot 1, and is also prescribed for each type of dot with regard to MYRVK.

As shown in FIG. 12, the distribution table of both dots before and after correction is made in such a way that the CMYRVK data may be converted into dot amount data for each color and type of dot by referring the output gradation values corresponding to the type of dot from the address corresponding to the value of each gradation data constituting the CMYRVK data. For correcting the reference dot distribution table 14*d* before correction, a corrected dot distribution table can be created by replacing the output gradation values of the table 14*d* with the output gradation values of the color correcting table 14*f*. For example, when the output gradation values of C small dot 1 in the reference table 14*d* are $A_i$, the output gradation values $A_i$ of C small dot 1 are corrected by replacing $A_i$ with $AC_i$ with regards to the output gradation values of the table 14*d*, because the color correction LUT of FIG. 11 stores the output gradation values $AC_i$ corresponding to the input gradation values $A_i$.

When the corrected dot distribution table has been created, the question of whether all the colors and types of dots have been set or not is judged (S425), and when the conditions are not fulfilled, S410-S425 are repeated, and when the conditions have been fulfilled, the process proceeds to S120, where the color image data are inputted, colors are converted, and the dot amount data are generated by referring the corrected dot distribution table (S120-S130). And, the image for printing of which the colors are compensated by using the dot amount data can be printed by the printer (S155-S165).

As a result, the operation of correcting the printing data can be accelerated and the operating speed of printing control for the printer can be improved by correcting and storing the dot distribution table once.

Figure 16:
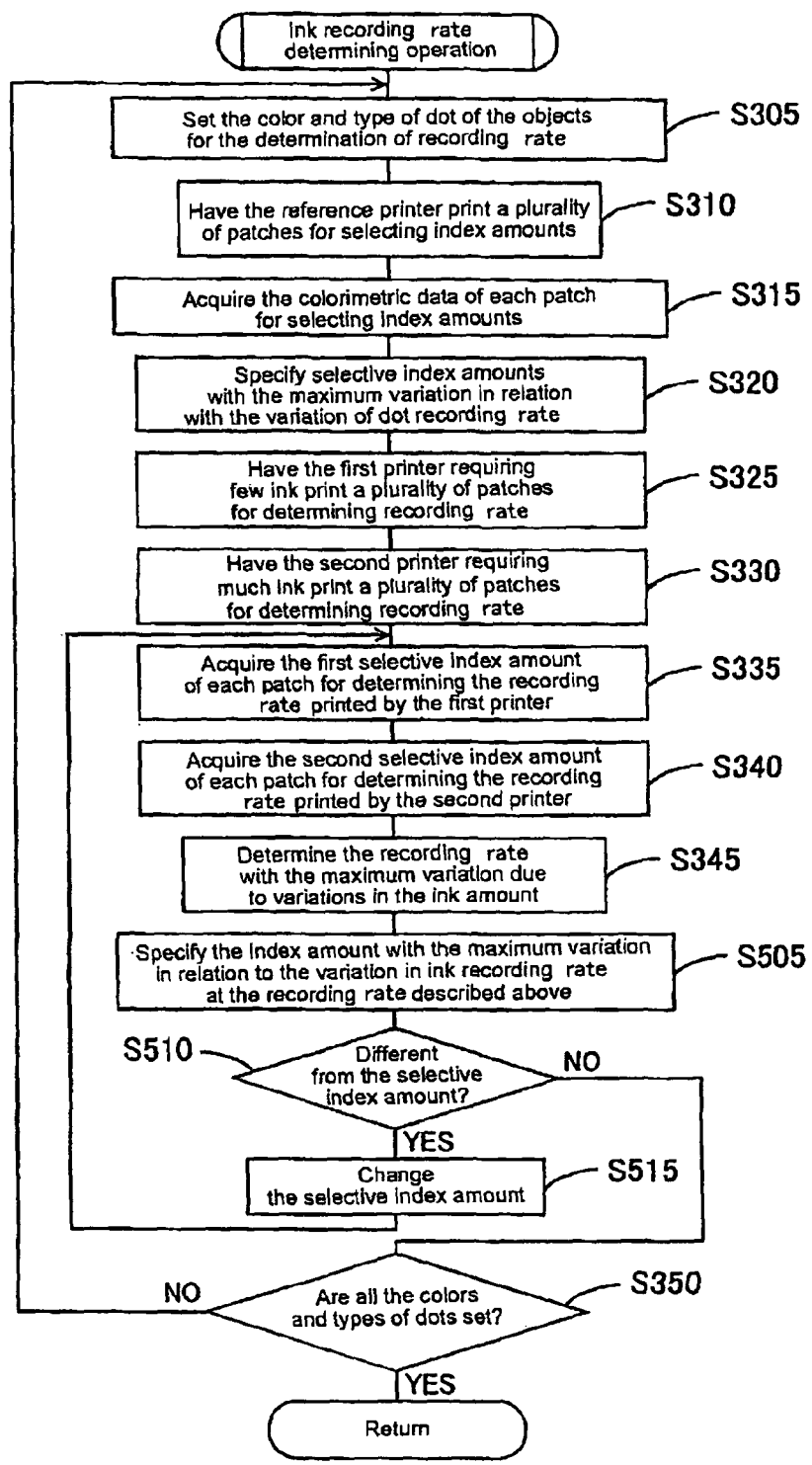
FIG. 16 is a flowchart showing the process of determining recording rates of ink in a variant.

In addition, the operation of determining the recording rate of ink shown in FIG. 16 may be carried out. Incidentally, while S305-S350 are roughly the same as the flow shown in FIG. 14, in S310, as FIG. 5 shows, a plurality of patches P1 for selecting index amounts of a plurality of stages of dot recording rates Rk (for example, k=1, 2, . . . , 9 R1=10%, R2=20%, . . . , R9=90%) are printed on a specified printing paper, the HD 14 stores the recording rate data 14a for selective index amount including the plurality of stages of dot recording rates Ri. And after S345 wherein the dot recording rate DR with the maximum variation in colorimetric data due to variations in the amount of ink adhering on the printing medium in S345 is stored in the RAM 13, the process proceeds to S505.

In S505, regarding the colors and types of dots set, based on the index amounts L, a, and b obtained from the colorimetric data of patches P1 for selecting index amounts and the dot recording rate Rk of printing the patches P1, the index amount having the maximum variation in relation to the variation of the dot recording rate from among the index amounts L, a, and b at a dot recording rate DR determined in S345 is specified as the index amount for confirming the selective index amount. In the example of FIG. 5, when the determined dot recording rate DR is 30%, and a dot recording rate smaller than 30% of 20% is represented by R1' and a dot recording rate greater than 30% of 40% is represented by R2', the index amounts obtained by measuring the color of the patch for selecting the index amount at a dot recording rate of R1' are represented by L1', a1' and b1', the index amount obtained by measuring the color of patches for selecting the index amount at a dot recording rate of R2' are represented by L2', a2' and b2', and the difference of index amounts for patches for selecting both index amounts at dot recording rates R1' and R2', namely $\Delta L'=|L2'-L1'|$, $\Delta a'=|a2'-a1'|$, $\Delta b'=|b2'-b1'|$ is calculated, the index amount corresponding to the maximum calculated value from among $\Delta L'$, $\Delta a'$ and $\Delta b'$ can be specified as the index amount for confirmation. The values of $\Delta L'$, $\Delta a'$ and $\Delta b'$ will grow larger as the difference among the index amounts for the patches for selecting both index amounts at recording rates of R1' and R2' grows larger.

Evidently, with regards to each index amount L, a and b, curves representing the relationship of correspondence for each dot recording rate may be respectively obtained by means of polynomial equation approximation and the like, the absolute value of inclination of the curve at the dot recording rate DR may be obtained, and the index amount corresponding to the maximum value from among the absolute value of the inclination may be taken as the index amount for confirmation. Here, with regards to each index amount, when a formula expressing the relationship of correspondence for the dot recording rate in which the dot recording rate is taken as a parameter is adopted and that a differentiation equation obtained by differentiating the formula by the dot recording rate is solved by substituting the dot recording rate DR, the inclination of the curve can be calculated.

Then, the question of whether the specified index amount for confirmation is different from the selective index amount specified in S320 or not is judged (S510). If the condition is fulfilled, the selective index amount is replaced by the index amount for confirmation specified in S505 (S515), and S335-S510 are repeated. If the conditions are not fulfilled, it will be judged whether all the colors and types of dots have been set or not (S350), and when the conditions are not fulfilled, S305-S350 are repeated, and when the conditions have been fulfilled, the process is terminated.

When the dot recording rate for printing patches for correcting colors is determined after the selective index amount with the maximum variation in relation to the variation in the dot recording rate (recording rate of ink) has been selected, the dot recording rate determined is not necessarily the index amount with the maximum variation in relation to the variation in the recording rate of dot. In the operation mentioned above, the index amount with the maximum variation in relation to the variation in dot recording rate from among the index amounts L, a, and b at the dot recording rate DR determined in S345 is specified as the index amount for confirmation, and when the specified index amount is different from the selective index amount, the selective index amount is replaced by the specified index amount, and again the colors of each patch P2 for determining the recording rate which is the changed selective index amount are measured in the color space Lab to obtain the first and second selective index amount for each patch P2 for determining the recording rate, and the recording rate with the maximum variation due to variations in the amount of ink adhering on the printing medium occurring for each printer with regard to the changed selective index amount is determined. Therefore, the color reproductiveness of the objective printer in relation to the reference colors can be further improved.

In addition, the storage in advance of the standard recording rate table D21 shown in FIG. 17 in the HD 14 and the use of the table D21 can be an effective means for reducing the dot recording rate of patches for correcting colors to be printed as the ink amount of dot increases and for controlling the printer to print patches for correcting colors of the standard recording rate by type of dot on the printing medium. As shown on FIG. 6, the maximum value of selective color component variation VSi for dot recording rate of a color is due to the fact that dot recording rate decreases as the ink amount of dot increases. Incidentally, the standard recording rate table D21 is created for each color and each set mode (set mode for the size of dot), and FIG. 17 shows an example of the set mode 1 for Y.

Figure 18:
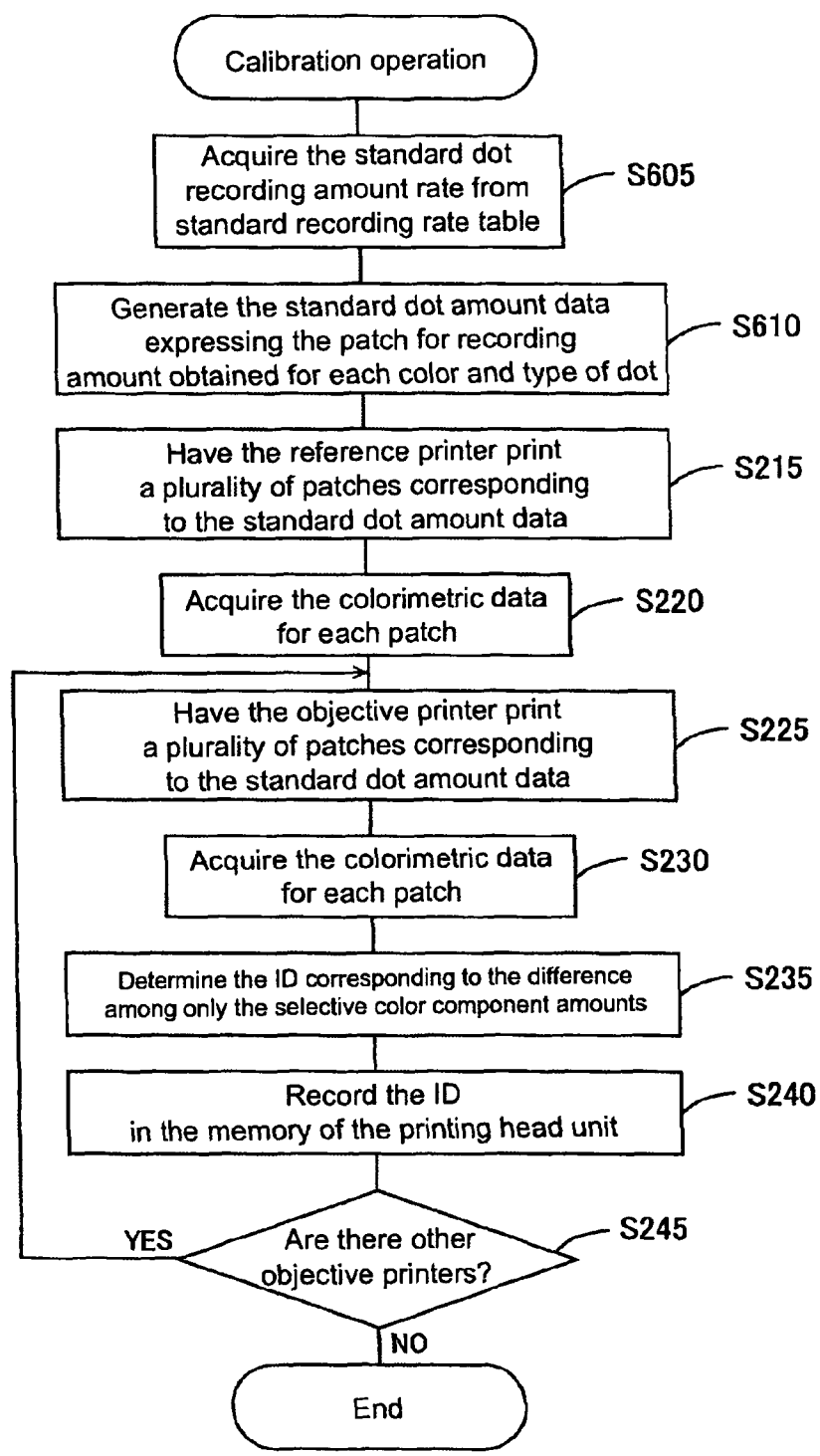
FIG. 18 is a flowchart showing the calibration process in a variant.

FIG. 18 shows the calibration operation performed by a color correcting device for executing a calibration operation by using the standard recording rate table. Incidentally, S215-S245 are roughly the same as those shown in FIG. 13.

In the present variant, in place of executing the operation of determining the ink recording rate, in the first place the standard dot recording rate SR is acquired for each color and each type of dot from the standard recording rate table D21 stored in the HD to be stored temporarily in the RAM (S605). In other words, a standard dot recording rate SR reduced as the ink amount of dot increases is specified as the standard dot recording rate for correcting printing data. Then, the standard dot amount data 13d expressing a plurality of corresponding plain patches for correcting colors from the dot recording rate obtained in S605 for each color and type of dot are generated to be stored temporarily in the RAM 13 (S610). Then, the reference printer is made to print a plurality of patches P4 for correcting reference colors to obtain each patch P4 for correcting reference colors, and the objective printer is made to print a plurality of patches P3 for correcting colors to obtain the colorimetric data for each patch P3 for correcting colors (S215-S230). By the operations of S215 and S225, the recording rate of dot can be reduced as the ink amount of dot increases and the printer can be controlled to print the patches for correcting colors of the standard recording rate by the type of dot on the printing medium. And the value of ID c·(SS−SO) corresponding to the difference of only selective index amounts is calculated by color and type of dot, and the determined ID is recorded in the memory 31 of the objective printers. The steps S225-S245 are repeated until the ID is recorded in the memory 31 of all the printers (S235-S245).

Then, the execution of the printing control operation shown in FIG. 9 leads to the correction of dot amount data (printing data) for each color of the ink and the type of dot so that the colors of the image for printing may be compensated and to the control of the objective printers to print the images for printing corresponding to the corrected printing data on the printing medium.

Incidentally, when the small dot is taken as the first dot of the present invention and at least one of the medium dot or the large dot is taken as the second dot of the present invention, the recording rate of dot of the patches for correcting colors printed by the second dot can be reduced in comparison with the dot recording rate of the patches for color correction printed by the first dot, and the printers will be controlled to print separate patches for color correction of the standard dot recording rate by the first and second dot on the printing medium. On the other hand, when the large dot is taken as the second dot, and at least one of the small dot and the medium lot is taken as the first dot, the same thing can be said.

As the dot recording rate with a large variation in the selective index amount due to variations in the amount of ink adhering on the printing medium occurring for each printer decreases as the ink amount of dot increases, the execution of the operation described above can result in an improved color reproductiveness of the objective printers in relation to the reference colors.

As described above, various modes of carrying out the present invention enable to speed up the calibration operation of the printing devices and to obtain a good color reproductiveness of the printing devices in relation to the reference colors.

What is claimed is:

1. A color correcting method for compensating a color drift in a printing device for printing on a printing medium a printing image corresponding to printing data by using a printing head for adhering ink on the printing medium, the method comprising:

determining an ink recording rate having a maximum variation of colorimetric data from among a plurality of stages of ink recording rates, wherein the variation of colorimetric data occurs by means of a variation of an amount of ink adhering on the printing medium on each printing device;

controlling the printing device to print a standard image of the determined ink recording rate on the printing medium; and compensating a color drift in the printing device by correcting the printing data based on a result of comparing the standard image of the ink recording rate having the maximum variation printed on the printing medium with a reference standard image.

2. A color correcting method for compensating a color drift in a printing device for printing on a printing medium a printing image corresponding to printing data by using a printing head for adhering ink on the printing medium, the method comprising:

determining an ink recording rate having a maximum variation of colorimetric data from among a plurality of stages of ink recording rates, wherein the variation of colorimetric data occurs by means of a variation of an amount of ink adhering on the printing medium on each printing device;

controlling the printing device to print a standard image of the determined ink recording rate on the printing medium;

measuring a color of the standard image with the maximum variation in ink recording rate printed on the printing medium in a specified color space to acquire colorimetric data of the standard image; and compensating a color drift in the printing device by correcting the printing data based on a result of comparing the colorimetric data with reference colorimetric data.

3. The color correcting method according to claim 2 further comprising:

controlling a first printing device and a second printing device requiring more ink adhering on the printing medium than the first printing device to print a plurality of images for determining recording rate, of which the ink recording rate is changed, on the printing medium;

measuring in the specified color space a color of each of the images for determining recording rate printed by the first printing device to acquire first colorimetric data for each of the images for determining recording rate;

measuring in the specified color space a color of each of the images for determining recording rate printed by the second printing device to acquire second colorimetric data for each of the images for determining recording rate;

determining as an ink recording rate for printing the standard image, from the first and second colorimetric data and a recording rate of ink with which the images for determining recording rates are printed, an ink recording rate with a maximum variation in colorimetric data due to variations in an amount of ink adhering on the printing medium, the variations for the ink occurring on each printing device, and controlling the printing device to print the standard image of the determined ink recording rate on the printing medium.

4. The color correcting method according to claim 3 wherein the first printing device is a device for adhering an ink on the printing medium at a lower limit of variation of an ink amount, while the second printing device is a device for adhering an ink on the printing medium at an upper limit of variation of an ink amount.

5. The color correcting method according to claim 3 further comprising:

comparing the acquired colorimetric data of the standard image having the maximum variation in ink recording rate with the reference colorimetric data;

correcting the printing data by using a result of comparing only index amounts having a maximum variation with the variation of the ink recording rates from among a plurality of index amounts acquired from the colorimetric data; and compensating a color drift in the printing device having printed the standard image for this correction of printing data.

6. The color correcting method according to claim 5 further comprising:

controlling a reference printing device serving as a reference to print a plurality of images for selecting index amounts, in which images the recording rate of ink has been changed, on the printing medium;

acquiring their colorimetric data for each image for selecting index amounts by measuring in the specified color space a color of each printed images for selecting index amounts;

specifying as an index amount for correcting printing data, a selective index amount having a maximum variation in relation to the variation of ink recording rates from among a plurality of index amounts acquired from the colorimetric data, based on the colorimetric data and the recording rate of ink with which the images for selecting index amounts are printed; and correcting the printing data by using a result of comparison of only the selective index amount, when correcting the printing data from result of comparing the colorimetric data of the acquired standard image of ink recording rate having the maximum variation with the reference colorimetric data.

7. The color correcting method according to claim 6 further comprising:

controlling the reference printing device to print a first image for selecting an index amount having a first recording rate and a second image for selecting an index amount having a second recording rate on the printing medium;

acquiring colorimetric data for the first image and the second image by measuring the color of the first image and the second image in the specified color space;

acquiring the colorimetric data for the first image and the second image for each index amount;

calculating a difference of index amounts relating to the first image and the second image for each index amount; and specifying an index amount having a largest difference as the selective index amount.

8. The color correcting method according to claim 6 wherein the plurality of index amounts has respectively the same number of gradations with different gradation values.

9. The color correcting method according to claim 3 further comprising:

specifying, as an index amount for confirmation of a selective index amount, an index amount having the maximum variation in relation to variations in the ink recording rate, from among the plurality of index amounts, in the ink recording rate for printing the determined standard image, based on the colorimetric data of the color of the image for selecting index amounts measured in the specified color space and the recording rate of ink with which the images for selecting the index amounts is printed, and replacing the selective index amount with the specified index amount when the specified index amount is different from the selective index amount, and wherein determining the ink recording rate for printing the standard image comprises:

when the selective index amount is replaced by the specified index amount, acquiring a first selective index amount for each image for determining the recording rate by measuring in the specified color space the color of the changed selective index amount constituting each image for determining recording rate printed by the first printing device;

acquiring a second selective index amount for each image for determining the recording rate by measuring in the specified color space the color of the changed selective index amount constituting each image for determining recording rate printed by the second printing device; and determining a recording rate with a maximum variation due to a variation in an ink amount adhering on the printing medium, the variation occurring for each printing device, with regard to the selective index amount, based on the first and second selective index amount and the recording rate of ink with which the plurality of images for determining the recording rate is printed.

10. The color correcting method according to claim 1, wherein the printing head is provided for each type of ink, and the printing device is a device for printing images for printing on the printing medium by using a printing head corresponding to each type of the ink, and wherein the method further comprises:

controlling the printing device to print on the printing medium the standard image of an ink recording rate with the maximum variation in colorimetric data due to variations in ink amount adhering on the printing medium, the variation occurring for each type of the ink and for each printing device; and compensating a color drift in the printing device having printed the standard image by correcting the printing data based on the result of comparing the standard image printed on the printing medium and with a standard image serving as the reference for each type of the ink.

11. The color correcting method according to claim 1, wherein the printing device is a device capable of adhering a specified number of types of dots of different ink amounts from the printing head onto the printing medium, and wherein the method further comprises:

determining a dot recording rate having a maximum variation of colorimetric data from among a plurality of stages of ink recording rates for each type of dot, wherein the variation of colorimetric data occurs by means of a variation of an amount of ink adhering on the printing medium for each type of dot;

controlling the printing device to print a standard image of the determined ink recording rate on the printing medium for each type of dot; and compensating a color drift in the printing device having printed the standard image by correcting the printing data based on the result of comparing the standard image printed on the printing medium with the standard image serving as the reference for each type of dot.

12. A color correcting method for compensating a color drift in a printing device for printing on a printing medium a printing image corresponding to printing data by using a printing head for adhering ink on the printing medium, the method comprising:

specifying a selected index amount having a maximum variation in relation to a variation of an ink recording rate from among a plurality of index amounts corresponding to color components defining a specified color space;

controlling the printing device to print a standard image of a standard recording rate for the ink on the printing medium;

measuring color of a standard image printed on the printing medium in the specified color space to acquire colorimetric data of the standard image; and compensating a color drift in the printing device by correcting the printing data using a result of comparison of only the selected index amount when the colorimetric data and reference colorimetric data are compared.

13. The color correcting method according to claim 12, wherein the printing device is capable of adhering at least a first dot and a second dot requiring more ink than the first dot from the printing head onto the printing medium, and wherein the method further comprises:

controlling the printing device to print a standard image of a standard recording rate separately by the first dot and the second dot on the printing medium by decreasing the dot recording rate of the standard image to be printed by the second dot in the ink than the dot recording rate of the standard image to be printed by the first dot in the ink;

acquiring the colorimetric data of the standard image for each type of the dots by measuring in the specified color space the color of the standard image; and compensating a color drift in the printing device having printed the standard image by correcting the printing data using a result of comparison of only the index amounts having a maximum variation in relation to the variation in the recording rate of the dot, from among the plurality of index amounts, in the case where the printing data are corrected from the result of comparing for each type of the dot the colorimetric data of the acquired standard image with the reference colorimetric data.

14. The color correcting method according to claim 12, wherein the printing device is a device capable of adhering a specified number of types of dots of different ink amounts from the printing head onto the printing medium, and wherein the method further comprises:

controlling the printing device to print the standard image of the standard recording rate on the printing medium by the type of dot by decreasing the dot recording rate of the standard to be printed as the amount of ink per dot increases;

acquiring the colorimetric data of the standard image for each type of the dot by measuring in the specified color space the color of the standard image for each type of the dot printed on the printing medium; and compensating a color drift in the printing device having printed the standard image by correcting the printing data using a result of comparison of only the index amounts having a maximum variation in relation to the variation in the recording rate of the dot, from among the plurality of index amounts, in the case where the printing data are corrected from the comparison result for each type of the dot the colorimetric data of the acquired standard image and the reference colorimetric data.

15. A color correcting device for compensating a color drift in a printing device for printing on a printing medium a printing image corresponding to printing data by using a printing head for adhering ink on the printing medium, the device comprising:

a recording rate determining unit for determining an ink recording rate having a maximum variation of colorimetric data from among a plurality of stages of ink recording rates, wherein the variation of colorimetric data occurs by means of a variation of an amount of ink adhering on the printing medium on each printing device;

a standard image printing control unit for controlling the printing device to print a standard image of the determined ink recording rate on the printing medium;

a colorimetric data acquiring unit for acquiring colorimetric data of the standard image by measuring a color of the standard image with the maximum variation in ink recording rate printed on the printing medium in a specified color space; and a color correcting unit for compensating a color drift in the printing device by correcting the printing data based on a result of comparing the colorimetric data with reference colorimetric data.

16. A computer-readable storage medium having a color correcting program stored thereon, the color correcting program enabling a computer to execute a function of compensating a color drift in a printing device for printing on a printing medium a printing image corresponding to printing data by using a printing head for adhering ink on the printing medium, and the color correcting program causing the computer to execute functions comprising:

a recording rate determining function for determining an ink recording rate having a maximum variation of colorimetric data from among a plurality of stages of ink recording rates, wherein the variation of colorimetric data occurs by means of a variation of an amount of ink adhering on the printing medium on each printing device;

a standard image printing control function for controlling the printing device to print a standard image of the determined ink recording rate on the printing medium;

a colorimetric data acquiring function for acquiring colorimetric data of the standard image by measuring a color of the standard image with the maximum variation in ink recording rate printed on the printing medium in a specified color space; and a color correcting function for compensating a color drift in the printing device by correcting the printing data based on a result of comparing the colorimetric data with reference colorimetric data.

17. A printing control device for controlling a printing device to print on a printing medium a printing image corresponding to printing data by using a printing head for adhering ink on the printing medium, wherein when (i) an ink recording rate having a maximum variation of colorimetric data is determined from among a plurality of stages of ink recording rates, wherein the variation of colorimetric data occurs by means of a variation of an amount of ink adhering on the printing medium on each printing device, (ii) the printing device is controlled to print a standard image of the determined ink recording rate on the printing medium, (iii) a standard image of an ink recording rate having the maximum variation printed on the printing medium is compared with a reference standard image, (iv) the printing data is corrected from the comparison result, and (v) a relationship of correspondence for correction of color before and after a correction of the printing data is specified, wherein the relationship is used for compensating a color drift in the printing device, the printing control device comprises:

a unit for correcting the printing data in view of the specified relationship of correspondence for the correction of color; and a unit for controlling the printing device to print on the printing medium images for printing corresponding to the corrected printing data.

18. A printing control device for controlling a printing device to print on a printing medium printing images corresponding to printing data by using a printing head for adhering ink on the printing medium wherein when (i) a selected index amount having a maximum variation in relation to a variation of an ink recording rate is specified from among a plurality of index amounts corresponding to color components defining a specified color space, (ii) the printing device is controlled to print on the printing medium a standard image of a standard recording rate by the ink, (iii) colorimetric data of the standard image on the printing medium is acquired by means of measuring the standard image in the specified color space, (iv) the colorimetric data of the standard image is compared with a reference standard image to correct the printing data, wherein the correction is made by using a result of comparison of only the selected index amount, and (v) a relationship of correspondence for correction of color before and after a correction of the printing data is specified, wherein the relationship is used for compensating a color drift in the printing device, the printing control device comprises:

a unit for correcting the printing data in view of the specified relationship of correspondence for the correction of color, and a unit for controlling the printing device to print on the printing medium images for printing corresponding to the corrected printing data.

19. A printing control method for controlling a printing device to print on a printing medium a printing image corresponding to printing data by using a printing head for adhering ink on the printing medium, the method comprising:

when (i) an ink recording rate having a maximum variation of colorimetric data is determined from among a plurality of stages of ink recording rates, wherein the variation of colorimetric data occurs by means of a variation of an amount of ink adhering on the printing medium on each printing device, (ii) the printing device is controlled to print a standard image of the determined ink recording rate on the printing medium, (iii) a standard image of an ink recording rate having the maximum variation printed on the printing medium is compared with a reference standard image, (iv) the printing data is corrected from the comparison result, and (v) a relationship of correspondence for correction of color before and after a correction of the printing data is specified, wherein the relationship is used for compensating a color drift in the printing device, the printing control method comprises:

correcting the printing data in view of the specified relationship of correspondence for the correction of color; and controlling the printing device to print on the printing medium images for printing corresponding to the corrected printing data.

20. A computer-readable storage medium having a color control program stored thereon, the color control program enabling a computer to execute a function of controlling a printing device to print on a printing medium a printing image corresponding to printing data by using a printing head for adhering ink on the printing medium wherein;

when (i) an ink recording rate having a maximum variation of colorimetric data is determined from among a plurality of stages of ink recording rates, wherein the variation of colorimetric data occurs by means of a variation of an amount of ink adhering on the printing medium on each printing device, (ii) the printing device is controlled to print a standard image of the determined ink recording rate on the printing medium, (iii) a standard image of an ink recording rate having the maximum variation printed on the printing medium is compared with a reference standard image, (iv) the printing data is corrected from the comparison result, and (v) a relationship of correspondence for correction of color before and after a correction of the printing data is specified, wherein the relationship is used for compensating a color drift in the printing device, the color control program causing the computer to execute functions comprising:

a function of correcting the printing data in view of the specified relationship of correspondence for the correction of color; and a function of controlling the printing device to print on the printing medium images for printing corresponding to the corrected printing data.

* * * * *